US010613585B2

(12) United States Patent
Park

(10) Patent No.: US 10,613,585 B2
(45) Date of Patent: Apr. 7, 2020

(54) TRANSPARENT DISPLAY APPARATUS, GROUP PLAY SYSTEM USING TRANSPARENT DISPLAY APPARATUS AND PERFORMANCE METHODS THEREOF

(71) Applicant: SAMSUNG ELECTRONICS CO., LTD., Suwon-si (KR)

(72) Inventor: Sang-young Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 547 days.

(21) Appl. No.: 14/717,228

(22) Filed: May 20, 2015

(65) Prior Publication Data

US 2015/0373480 A1 Dec. 24, 2015

(30) Foreign Application Priority Data

Jun. 19, 2014 (KR) .................. 10-2014-0074838
Oct. 10, 2014 (KR) .................. 10-2014-0136542

(51) Int. Cl.
*G06F 3/048* (2013.01)
*G06F 1/16* (2006.01)

(52) U.S. Cl.
CPC .......... *G06F 1/1652* (2013.01); *G06F 1/1686* (2013.01)

(58) Field of Classification Search
CPC .......................................... G06F 3/0481–0489
See application file for complete search history.

(56) References Cited

U.S. PATENT DOCUMENTS

| 6,559,813 | B1 * | 5/2003 | DeLuca | G02B 27/22 345/629 |
| 7,161,590 | B2 * | 1/2007 | Daniels | G06F 1/1601 345/107 |
| 7,624,339 | B1 * | 11/2009 | Engel | G06F 3/1423 715/212 |
| 7,841,944 | B2 * | 11/2010 | Wells | G07F 17/3211 463/37 |
| 7,953,462 | B2 * | 5/2011 | Harry | G06Q 30/02 455/575.1 |

(Continued)

FOREIGN PATENT DOCUMENTS

| KR | 10-0606797 B1 | 8/2006 |
| KR | 10-2007-0066382 A | 6/2007 |

(Continued)

OTHER PUBLICATIONS

Communication dated Aug. 20, 2019, issued by the Korean Patent Office in counterpart Korean Application No. 10-2014-0136542.

(Continued)

*Primary Examiner* — Steven B Theriault
(74) *Attorney, Agent, or Firm* — Sughrue Mion, PLLC

(57) ABSTRACT

A transparent display apparatus includes a first transparent display, an interface which communicates with a second display apparatus, and a controller which connects communication with the second display apparatus when the first transparent display and the second display apparatus at least partly overlap with each other, and performs the interoperation with the second display apparatus. Accordingly, a user may use various group play functions by using the transparent display apparatus and the second display apparatus, in-turn enhancing device applicability and user convenience.

15 Claims, 30 Drawing Sheets

(56) References Cited

U.S. PATENT DOCUMENTS

| | | | | |
|---|---|---|---|---|
| 8,154,472 B2* | 4/2012 | Yamaguchi | G06F 3/1423 | 345/1.1 |
| 8,230,075 B1* | 7/2012 | Weskamp | H04W 4/023 | 709/227 |
| 8,462,106 B2* | 6/2013 | Tziortzis | G06F 3/01 | 345/156 |
| 8,508,433 B2* | 8/2013 | Manning | G06F 1/1616 | 345/1.3 |
| 8,624,797 B2 | 1/2014 | Lee et al. | | |
| 8,886,782 B2* | 11/2014 | Lucero | G06Q 50/01 | 709/203 |
| 8,997,017 B2* | 3/2015 | Stecher | G06F 3/0481 | 715/759 |
| 9,058,763 B2* | 6/2015 | Burgess | G09G 5/12 | |
| 9,075,568 B1* | 7/2015 | Gray | G06F 1/1626 | |
| 9,158,334 B2* | 10/2015 | Vanska | G06F 1/1626 | |
| 9,256,342 B2* | 2/2016 | Davidson | G06F 3/0481 | |
| 9,318,070 B2* | 4/2016 | Park | G09G 5/00 | |
| 9,354,742 B2* | 5/2016 | Nagaraju | G06F 3/0416 | |
| 9,360,929 B2* | 6/2016 | Noda | G06F 3/005 | |
| 9,368,081 B2* | 6/2016 | Kim | G09G 3/3648 | |
| 9,373,302 B2* | 6/2016 | Walker | G09G 5/006 | |
| 9,395,833 B2* | 7/2016 | Lee | G06F 3/04883 | |
| 9,400,522 B2* | 7/2016 | Inami | G06F 3/1438 | |
| 9,417,835 B2* | 8/2016 | Tait | G06F 3/1446 | |
| 9,524,049 B2* | 12/2016 | Yun | G06F 3/0414 | |
| 9,551,913 B2* | 1/2017 | Kim | G09G 5/10 | |
| 9,563,279 B2* | 2/2017 | Seo | G06F 1/1643 | |
| 9,654,767 B2* | 5/2017 | Bennett | H04N 13/0456 | |
| 9,804,635 B2* | 10/2017 | Kim | G06F 3/0488 | |
| 2002/0101447 A1* | 8/2002 | Carro | G06F 17/30855 | 715/760 |
| 2002/0167481 A1* | 11/2002 | Wong | G06F 1/1626 | 345/156 |
| 2004/0008191 A1* | 1/2004 | Poupyrev | G06F 3/011 | 345/184 |
| 2005/0168399 A1* | 8/2005 | Palmquist | G06F 1/1601 | 345/1.1 |
| 2006/0092170 A1* | 5/2006 | Bathiche | A63F 13/02 | 345/589 |
| 2006/0150109 A1* | 7/2006 | Schultz | G06F 9/451 | 715/759 |
| 2007/0009222 A1* | 1/2007 | Koo | H04N 13/395 | 385/147 |
| 2007/0091058 A1* | 4/2007 | Nam | G02B 27/2214 | 345/102 |
| 2007/0216805 A1* | 9/2007 | Yamamoto | H04N 13/0454 | 348/565 |
| 2008/0055271 A1* | 3/2008 | Yamaguchi | G06F 1/1609 | 345/173 |
| 2008/0192013 A1* | 8/2008 | Barrus | G06F 1/3203 | 345/173 |
| 2008/0211734 A1* | 9/2008 | Huitema | G02B 27/2214 | 345/3.1 |
| 2008/0216125 A1* | 9/2008 | Li | H04N 13/0239 | 725/62 |
| 2008/0247128 A1* | 10/2008 | Khoo | G06F 1/1616 | 361/679.04 |
| 2009/0201157 A1* | 8/2009 | Forster | G06K 19/07749 | 340/572.7 |
| 2009/0213032 A1* | 8/2009 | Newport | G06F 1/1626 | 345/1.1 |
| 2009/0295731 A1* | 12/2009 | Kim | G06F 1/1616 | 345/168 |
| 2009/0296331 A1* | 12/2009 | Choy | G06F 1/1616 | 361/679.09 |
| 2010/0011291 A1* | 1/2010 | Nurmi | G06F 3/0414 | 715/702 |
| 2010/0060548 A1* | 3/2010 | Choi | G06F 3/0414 | 345/1.3 |
| 2010/0260418 A1* | 10/2010 | Tsai | H04N 13/0029 | 382/166 |
| 2010/0275122 A1* | 10/2010 | Buxton | G06F 1/1626 | 715/728 |
| 2010/0289819 A1* | 11/2010 | Singh | G09G 3/003 | 345/619 |
| 2010/0328223 A1* | 12/2010 | Mockarram-Dorri | G06F 3/041 | 345/173 |
| 2011/0084893 A1* | 4/2011 | Lee | G06F 1/1649 | 345/6 |
| 2011/0134145 A1* | 6/2011 | Moriwaki | G09G 3/3208 | 345/660 |
| 2011/0138416 A1* | 6/2011 | Kang | G06F 3/0482 | 725/39 |
| 2011/0164047 A1* | 7/2011 | Pance | G06F 1/1647 | 345/581 |
| 2011/0187655 A1* | 8/2011 | Min | G06F 1/1643 | 345/173 |
| 2011/0246894 A1* | 10/2011 | Luo | G06F 3/0488 | 715/733 |
| 2011/0249024 A1* | 10/2011 | Arrasvuori | G06F 3/017 | 345/629 |
| 2012/0026290 A1* | 2/2012 | Lim | H04N 13/0239 | 348/46 |
| 2012/0054355 A1* | 3/2012 | Arrasvuori | G06Q 10/10 | 709/229 |
| 2012/0060089 A1* | 3/2012 | Heo | G06F 1/1647 | 715/702 |
| 2012/0099250 A1* | 4/2012 | Robinson | G06F 1/1615 | 361/679.01 |
| 2012/0102438 A1* | 4/2012 | Robinson | G06F 3/011 | 715/863 |
| 2012/0105487 A1* | 5/2012 | Son | G06F 3/0487 | 345/671 |
| 2012/0112994 A1* | 5/2012 | Vertegaal | G06F 3/017 | 345/156 |
| 2012/0120476 A1* | 5/2012 | Yeh | G02B 27/22 | 359/270 |
| 2012/0159472 A1* | 6/2012 | Hong | H04W 4/21 | 717/178 |
| 2012/0206319 A1* | 8/2012 | Lucero | H04N 21/4788 | 345/1.3 |
| 2012/0206386 A1* | 8/2012 | Xu | G06F 1/1616 | 345/173 |
| 2013/0009863 A1* | 1/2013 | Noda | G06F 3/005 | 345/156 |
| 2013/0063332 A1* | 3/2013 | Inoue | G02B 27/2214 | 345/102 |
| 2013/0135182 A1* | 5/2013 | Jung | G09G 3/00 | 345/30 |
| 2013/0145311 A1* | 6/2013 | Joo | G06F 3/04886 | 715/788 |
| 2013/0155590 A1* | 6/2013 | Tani | H04M 1/0237 | 361/679.01 |
| 2013/0194167 A1* | 8/2013 | Yun | G09G 5/003 | 345/84 |
| 2013/0196718 A1* | 8/2013 | Tani | G01C 21/20 | 455/566 |
| 2013/0332542 A1* | 12/2013 | Foo | G06F 13/385 | 709/206 |
| 2013/0337747 A1* | 12/2013 | Lee | G06F 3/0488 | 455/41.2 |
| 2014/0035869 A1* | 2/2014 | Yun | G06F 3/0414 | 345/174 |
| 2014/0035942 A1* | 2/2014 | Yun | G09G 5/006 | 345/592 |
| 2014/0043209 A1* | 2/2014 | Walker | G09G 5/006 | 345/1.2 |
| 2014/0055344 A1 | 2/2014 | Seo et al. | | |
| 2014/0075349 A1* | 3/2014 | Yun | G06F 3/013 | 715/764 |
| 2014/0123038 A1* | 5/2014 | Ahn | G06F 3/0488 | 715/761 |
| 2014/0184628 A1* | 7/2014 | Lee | G06F 3/1423 | 345/545 |
| 2014/0192281 A1* | 7/2014 | Smithwick | G02F 1/1313 | 349/15 |

(56) References Cited

U.S. PATENT DOCUMENTS

| | | | | |
|---|---|---|---|---|
| 2014/0237048 A1* | 8/2014 | Lee | .......................... | G06F 9/54 |
| | | | | 709/204 |
| 2014/0285639 A1* | 9/2014 | Gyoung | ............. | G02B 27/2264 |
| | | | | 348/52 |
| 2014/0306908 A1* | 10/2014 | Nagaraju | ............... | G06F 3/0416 |
| | | | | 345/173 |
| 2015/0007066 A1* | 1/2015 | Joo | ....................... | G06F 3/0481 |
| | | | | 715/761 |
| 2015/0338888 A1* | 11/2015 | Kim | ..................... | G06F 1/1677 |
| | | | | 345/156 |
| 2016/0179236 A1* | 6/2016 | Shin | ..................... | G06F 1/1616 |
| | | | | 345/173 |

FOREIGN PATENT DOCUMENTS

| | | |
|---|---|---|
| KR | 10-2011-0038980 A | 4/2011 |
| KR | 10-2013-0013967 A | 2/2013 |
| KR | 10-2013-0037100 A | 4/2013 |

OTHER PUBLICATIONS

Communication dated Feb. 6, 2020, issued by the Korean Patent Office in counterpart Korean Patent Application No. 10-2014-0136542.

* cited by examiner

TRANSPARENT DISPLAY APPARATUS, GROUP PLAY SYSTEM USING TRANSPARENT DISPLAY APPARATUS AND PERFORMANCE METHODS THEREOF

CROSS-REFERENCE TO RELATED APPLICATIONS

This application claims priority from Korean Patent Application Nos. 10-2014-0136542 and 10-2014-0074838, respectively filed on Oct. 10, 2014 and Jun. 19, 2014 in the Korean Intellectual Property Office, the disclosures of which are incorporated herein by reference in its entirety.

BACKGROUND

1. Field

Apparatuses, systems and methods relate to a transparent display apparatus, a group play system configured to use the transparent display apparatus, and performance methods thereof, and more specifically, to a transparent display apparatus, a group play system configured to provide a group play function by using the transparent display apparatus and another display apparatus, and performance methods thereof.

2. Description of the Related Art

With the development of the electronic technology, various types of display apparatuses are used in various fields. Specifically, researches and discussions on the next-generation display apparatuses including a transparent display have accelerated recently.

The transparent display refers to an apparatus having the transparent properties in which backgrounds at the rear of the device are viewable through the display of the device as they are. The related technology produces a display panel by using non-transparent semiconductor compounds such as silicon (Si) and gallium arsenide (GaAs). However, while need for various display services that cannot be implemented with the related display panel emerge, efforts to develop new type of electronic device meeting the need are made. The transparent display has been developed by one of the above efforts.

The transparent display is formed so as to include a transparent oxide semiconductor layer which imparts the transparent property to the transparent display. When the transparent display is used, a user may view necessary information on the transparent display screen with backgrounds that are present in the back of the apparatus. Therefore, limitations regarding the dimension and the time that may be shown by the related display apparatuses can be removed.

However, the display apparatus including the transparent display may not be greatly different from the related display apparatuses except for the simultaneous viewing ability of the backgrounds which are present in back of the apparatus along with the information on the transparent display, because abilities to express the display screen have limitations.

Further, the display apparatus including the transparent display is also not greatly different from the related display apparatuses which includes camera, considering that the transparent display is able to provide a camera function with only one camera because of space limitations.

Therefore, possibilities for utilizing the transparent display apparatus in different ways, for user satisfaction are necessary.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide a transparent display apparatus, a group play system configured to provide a group play function by using the transparent display apparatus and another display apparatus, and performance methods thereof.

According to an aspect of an exemplary embodiment, a transparent display apparatus includes a first transparent display, an interface configured to perform communication with another display apparatus, and a controller configured to communicate with a second display apparatus and interoperate with the second display apparatus when the first transparent display and the second display apparatus at least partly overlap each other.

According to another exemplary embodiment, when a second transparent display provided on the second display apparatus and the first transparent display at least partly overlap each other, the controller interoperates with the second display apparatus so as to provide an interoperation screen on the overlapping area.

According to another exemplary embodiment the controller displays a graphic guide to encourage gradually adjusting the size of the overlapping area between the first transparent display and the second transparent display on at least one of the first transparent display and the second transparent display.

According to another exemplary embodiment, when 3D content is played back while the first transparent display and the second transparent display overlap each other, the controller displays a 3D content screen combining a left-eye image and a right-eye image of the 3D content on one of the first transparent display and the second transparent display, and displays a barrier screen corresponding to the 3D content screen on the other of the first transparent display and the second transparent display.

According to another exemplary embodiment when content including a front image and a background image is played back while the first transparent display and the second transparent display overlap each other, the controller displays the front image on the transparent display arranged in a direction closer to the user, from among the first transparent display and the second transparent display, and displays the background image on the other transparent display among the first transparent display and the second transparent display.

According to another exemplary embodiment, the transparent display apparatus further includes a camera, a storage configured to store a first image photographed by the camera, an inputter configured to receive a command to capture image, and an image processor, wherein, in response to an input of the command to capture image, the controller is further configured to control the camera to photograph an object, transmit the command to capture image to the another display apparatus, and in response to receiving a second image photographed by the second display apparatus, through the interface, control the image processor to create content by combining the first image and the second image.

According to another exemplary embodiment, the controller creates a combined image by performing at least one of size change and color compensation on one of the first image and the second image so as to correspond to the other of the first image and the second image.

According to another exemplary embodiment, the image processor creates 3D content using one of the first image and the second image as left-eye image, and using the other of the first image and the second image as right-eye image.

According to another exemplary embodiment, the transparent display apparatus further includes a connector configured to connect the transparent display apparatus to the second display apparatus.

According to another exemplary embodiment, the transparent display apparatus further includes a sensor configured to sense whether the first transparent display and the second display apparatus overlap each other, wherein the controller is further configured to display a message inquiring about possibility of interoperation with the second display apparatus on the first transparent display, in response to sensing that the first transparent display and the second display apparatus overlap each other, and perform the interoperation with the another display apparatus through the interface in response to input of a command to interoperate.

According to an aspect of an exemplary embodiment, group play performing method of a transparent display apparatus includes, when a first transparent display provided on the transparent display apparatus and a second display apparatus at least partly overlap each other, communicating with the second display apparatus, and performing a group play function of providing one service in interoperation with the second display apparatus.

According to an aspect of an exemplary embodiment, a group play system for providing a group play function of performing one service with a plurality of apparatuses interoperating with each other includes a first transparent display apparatus, and a second display apparatus configured to, when the second display apparatus is positioned to overlap with the first transparent display apparatus, communicate with the first transparent display apparatus, and perform the group play function in interoperation with the first transparent display apparatus.

According to an aspect of an exemplary embodiment, a transparent display apparatus includes a transparent display having flexible property, and a controller configured to, when a first area of the transparent display is bent and overlapped with a second area of the transparent display, control the transparent display to display an interoperation screen on one of the first area and the second area, by respectively controlling display operation of the first area and the second area.

According to another exemplary embodiment, the controller is further configured to display different screens on the transparent display, by separately controlling the overlapping area and a third area, which is an area other than the overlapped first and second areas.

According to another exemplary embodiment, the controller is further configured to display a 2D image on the third area and a 3D image on the overlapping area.

According to another exemplary embodiment, the controller is further configured to display a graphic guide to encourage gradually adjusting a size of the overlapping area regarding the transparent display on the transparent display.

According to another exemplary embodiment, when 3D content is played back while the first area and the second area are overlapping each other, the controller is further configured to display a 3D content screen combining a left-eye image and a right-eye image of the 3D content on one of the first area and the second area, and displays a barrier screen corresponding to the 3D content screen on the other of the first area and the second area.

According to another exemplary embodiment, when the content including front image and the background image is played back while the first area and the second area are overlapping each other, the controller displays a front image on an area arranged in a direction closer to the user from among the first area and the second area, and displays the background image on the other of the first area and the second area.

According to another exemplary embodiment, the transparent display apparatus further includes a sensor configured to sense whether the first area and the second area are overlapping each other, wherein, when the first area and the second area are sensed to be overlapping each other, the controller is further configured to display a message inquiring about a possibility of interoperation of the first area and the second area on the transparent display, and performs the interoperation the first area and the second area in response to an input of a command to interoperate.

According to another exemplary embodiment, when the transparent display is bent a plurality of times, thus creating an overlapping area including three or more transparent layers, the controller distinguishes a three-dimensional image into three or more two-dimensional slice images and respectively displays the three or more slices on the three or more transparent layers of the overlapping area, wherein number of the slice images corresponds to number of the layers of the overlapping area.

According to an aspect of an exemplary embodiment, a transparent display apparatus includes a first transparent display, and a controller configured to communicate with a second display apparatus and operate in conjunction with the second display apparatus when the first transparent display and the second display apparatus at least partly overlap with each other.

According to an aspect of an exemplary embodiment, a flexible transparent display apparatus, includes a flexible transparent display, and a controller configured to, when the flexible transparent display is bent to create overlapping areas, control the flexible transparent display to separately control display operation of the overlapping areas.

According to another exemplary embodiment, the controller is further configured to perform the display operations of the overlapping areas in conjunction with each other.

According to various embodiments, a user may use various group play functions by using the transparent display apparatus and another display apparatus. Thus, the device applicability and user convenience can be enhanced.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1A:
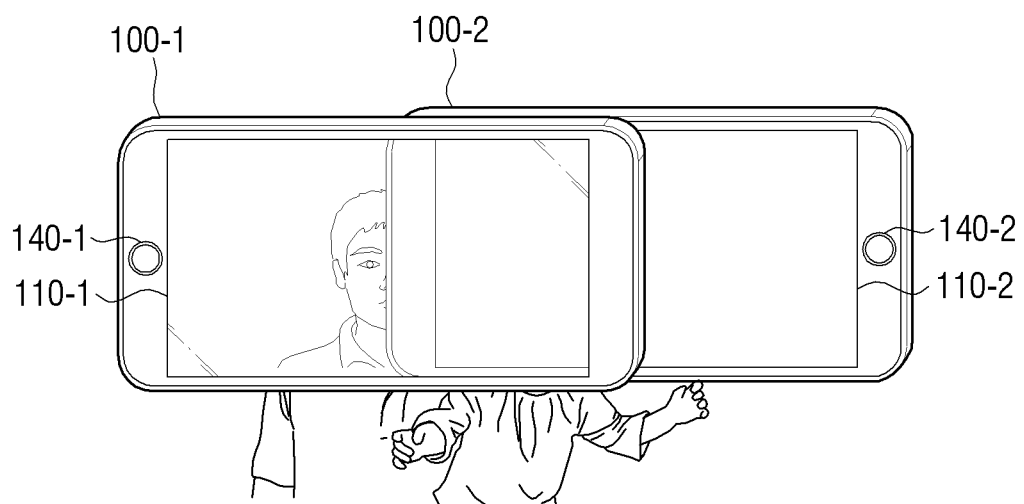
FIGS. 1A and 1B depict a view provided to explain a group play system, according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Figure 1B:
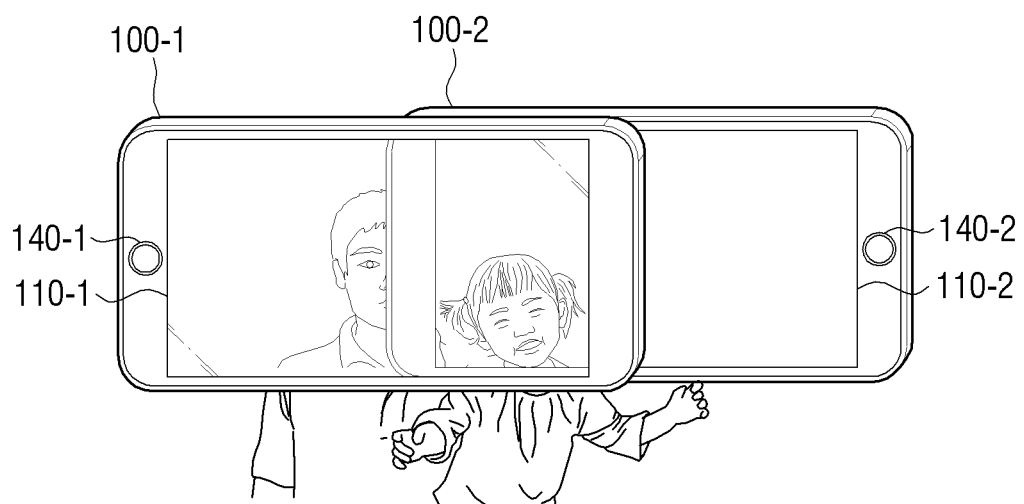

FIGS. 1A and 1B depict a view provided to explain a group play system according to an exemplary embodiment.

FIG. 1A depicts a view provided to explain a group play system including a transparent display apparatus 100-1 and another display apparatus 100-2 according to an exemplary embodiment. The group play system refers to a system for performing group play by combining a plurality of independent apparatuses. Furthermore, the group play refers to a function of providing one service of interoperation of a plurality of independent apparatuses with each other.

A user may use the group play function by overlapping the transparent display apparatus 100-1 and another display apparatus 100-2 to communicate between the transparent display apparatus 100-1 and another display apparatus 100-2 for interoperation between the apparatuses. For example, the transparent display apparatus 100-1 and another display apparatus 100-2 may include a first camera 140-1 and a second camera 140-2, respectively. The transparent display apparatus 100-1 and another display apparatus 100-2 may photograph simultaneously by using the first and the second cameras 140-1, 140-2, and create 3D content from the photographed results.

FIG. 1B depicts a view provided to explain a group play system including the transparent display apparatus 100-1 and another display apparatus 100-2 including a second transparent display 110-2 according to another exemplary embodiment. Thus, FIG. 1B depicts a view provided to explain an example in which another display apparatus 100-2 is a transparent display apparatus.

The group play system including a plurality of the transparent display apparatuses 100-1, 100-2 may provide additional functions including the camera function described above. For example, in response to inputting of a user command to perform 3D content playback function, one of the apparatuses may display 3D content screen combining left-eye image and right-eye image, and the other apparatus may display barrier screen corresponding to the 3D content screen.

Further, in response to inputting of a user command to perform a playback function of the content including front image and background image, one of the two apparatuses positioned more towards the direction of the user may display the front image, and the other apparatus may display the background image. That is, the apparatuses may support the function of playing back the content including the front image and the background image.

A user may confirm surrounding objects through transparent displays 110-1, 110-2 of the transparent display apparatus 100-1 and another display apparatus 100-2 overlapped with the transparent display apparatus 100-1. Further, because the displaying layers may be different to each other on the transparent display apparatus 100-1 and another display apparatus 100-2, overlapped with the transparent display apparatus 100-1, a user may feel the perspective through the overlapped first and second transparent displays 110-1, 110-2, and sense the dimensional feeling naturally. Therefore, 3D content may be displayed, or the content including the front image and the background image may be displayed.

The apparatuses of FIGS. 1A and 1B may be respectively combined to each other according to various methods. For example, a plurality of the display apparatuses may be combined with the coupling structure such as connecting link or projection and recess structure or magnetic object. Furthermore, a user may attach a plurality of the display apparatuses to each other by using his hands or other accessory structure (e.g., band, tape or device casing). The combining method will be specifically explained below in a later part of the specification.

Meanwhile, both of the transparent display apparatus 100-1 and another display apparatus 100-2 in FIGS. 1A and 1B may be positioned on the front based on a user. However, for convenient explanation, it will be described below that the transparent display apparatus 100-1 is positioned in front of a user.

Figure 2:
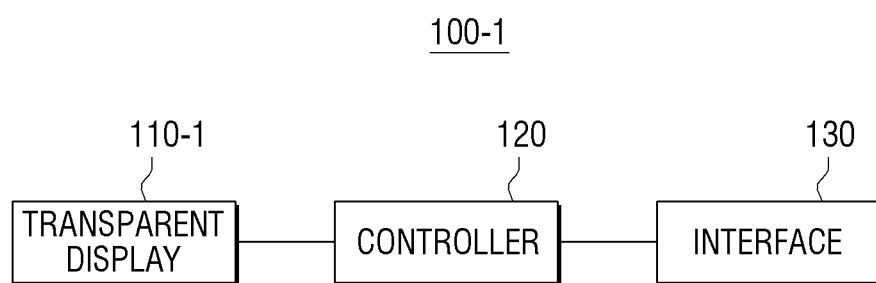
FIG. 2 is a block diagram of a transparent display apparatus, according to an exemplary embodiment.

FIG. 2 is a block diagram of the transparent display apparatus 100-1 according to an exemplary embodiment. The transparent display apparatus 100-1 of FIG. 2 may be included and used in the group play system of FIGS. 1A and 1B.

Referring to FIG. 2, the transparent display apparatus 100-1 includes the transparent display 110-1, a controller 120 and an interface 130. The interface 130 is configured to perform communication with another display apparatus 100-2. In order to distinguish from the second transparent display 110-2 of another display apparatus 100-2, the transparent display 110-1 is referred to as the first transparent display 110-1 hereinafter.

The first transparent display 110-1 refers to a display having transparent properties. A user may view background present in the back of the first transparent display 110-1 through the first transparent display 110-1. The first transparent display 110-1 may include OLED, and detailed constitution regarding the first transparent display 110-1 will be specifically described below.

The controller 120 may provide various group play functions to a user by controlling the transparent display apparatus 100-1.

Specifically, the controller 120 may communicate with another display apparatus 100-2 and interoperate with another display apparatus 100-2, when the first transparent display 110-1 and another display apparatus 100-2 at least partly overlap with each other.

Furthermore, the controller 120 may interoperate with another display apparatus 100-2 so as to provide an interoperation screen through the overlapping area, when the second transparent display 110-2 provided on another display apparatus 100-2 and the first transparent display 110-1 at least partly overlap with each other.

Specifically, when 3D content is played back while the first transparent display 110-1 and the second transparent display 110-2 overlap with each other, the controller 120 may display 3D content screen combining left-eye image and right-eye image on one of the first transparent display 110-1 and the second transparent display 110-2, and display barrier screen corresponding to 3D content on the other of the first transparent display 110-1 and the second transparent display 110-2.

Furthermore, when the content including front image and background image is played back while the first transparent display 110-1 and the second transparent display 110-2 overlap with each other, the controller 120 may control so as to display the front image on the first transparent display 110-1 arranged toward a user direction, and display the background image on the second transparent display 110-2, although such an arrangement is not limited thereto. Accordingly, the controller 120 may control so that the background image is displayed on the first transparent display 110-1 and the front image are displayed on the second transparent display 110-2, according to another exemplary embodiment.

Meanwhile, when the first transparent display 110-1 and the second transparent display 110-2 at least partly overlap with each other, the first transparent display apparatus 100-1 may communicate with another display apparatus 100-2 through the interface 130. Herein, the interface 130 may be configured to be a wired or a wireless interface. The wireless communication may be connected with a communicator 150 (see FIG. 7), and the communicator 150 may include various communication chips such as Wi-Fi chip 151, Bluetooth chip 152, near field communications (NFC) chip, or wireless communication chip 153 (see FIG. 7).

Figure 3:
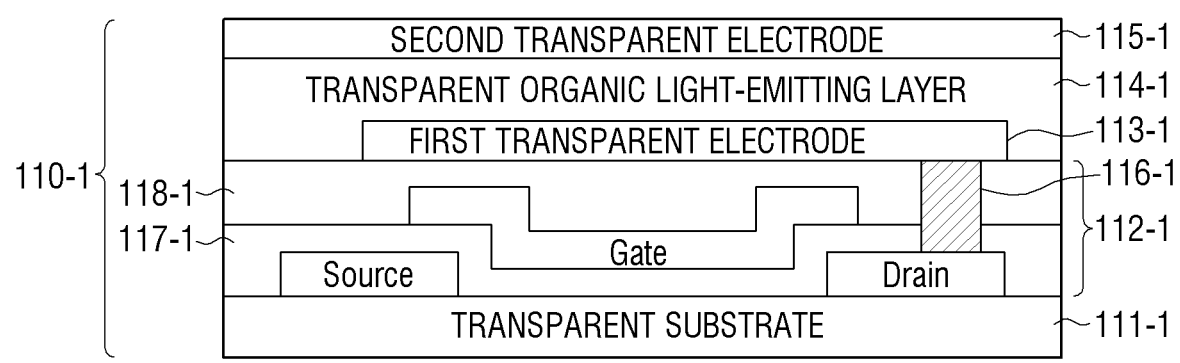
FIG. 3 depicts a view provided to explain various examples regarding detailed constitution of a first transparent display, according to an exemplary embodiment.

FIG. 3 depicts a view provided to explain various examples regarding detailed constitution of the first transparent display 110-1, according to an exemplary embodiment. Constitution of the second transparent display 110-2 may be uniform to that of the first transparent display 110-1, but is not limited thereto.

According to an embodiment of FIG. 3, the first transparent display 110-1 may be implemented to be transparent OLED type having a constitution as illustrated in FIG. 3.

The first transparent display 110-1 includes a transparent substrate 111-1, a transparent transistor layer 112-1, a first transparent electrode 113-1, a transparent organic light-emitting layer 114-1, a second transparent electrode 115-1, and a connecting electrode 116-1. Detailed constitution of the first transparent display 110-1 and operation thereof will now be explained in greater detail.

The transparent substrate 111-1 may include polymer material such as plastic, having the transparent properties or glass. The type of material of the transparent substrate 111-1 may be determined based on the environment in which the first transparent display 110-1 is to be used. For example, the polymer material has advantages in terms of lightness and flexibility, which may be used in a mobile display apparatus. The glass may be used in a show window of a shop or other general purpose windows.

The transparent transistor layer 112-1 refers to a layer including a transistor which is produced by substituting the non-transparent silicon of the related/conventional thin film transistor with the transparent material such as transparent zinc oxide or oxide titanium. The transparent transistor layer 112-1 may include source, gate, drain and various dielectric films 117-1, 118-1. Furthermore, the connecting electrode 116-1 may additionally be included to electrically connect the drain with the first transparent electrode 113-1. FIG. 3 illustrates one transparent transistor including the source, the gate and the drain within the transparent transistor layer 112-1. However, when implemented, a plurality of the transparent transistors evenly distributed throughout the entire area of the display surface may be provided.

The controller 120 may apply image source signals to the source, the gate, and the drain of each transistor within the transparent transistor layer 112-1, scan cells arranging certain transparent transistors, and display various screens by turning on corresponding cells. Specifically, the first transparent electrode 113-1 and the second transparent electrode 115-1 may be arranged on opposite directions based on the transparent organic light-emitting layer 114-1. The first transparent electrode 113-1, the transparent organic light-emitting layer 114-1 and the second transparent electrode 115-1 may form the transparent organic light-emitting diodes.

The transparent organic light-emitting diodes may be classified into passive matrix OLED (PMOLED) and active matrix OLED (AMOLED) according to the driving method. PMOLED is a structure in which intersecting areas of the first and the second transparent electrode 113-1, 115-1 form pixels. Meanwhile, AMOLED is a structure in which thin film transistors (TFT) driving each pixel are constituted. FIG. 3 illustrates AMOLED.

The first transparent electrode 113-1 and the second transparent electrode 115-1 respectively include a plurality of line electrodes, and arrangement direction of the line electrodes are formed orthogonally to each other. For example, when the line electrodes of the first transparent electrode 113-1 are arranged horizontally, the line electrodes of the second transparent electrode 115-1 may be arranged vertically. Thereby, a plurality of the intersecting areas may be formed between the first transparent electrode 113-1 and the second transparent electrode 115-1. Each intersecting areas may be connected with the transparent transistors, as illustrated in FIG. 3.

The controller 120 may form the electrical potential per intersecting areas by using the transparent transistors. Within the intersecting areas where the electrical potential is formed, electrons and holes from each electrode are applied into the transparent organic light-emitting layer 114-1 and bind to each other, resulting in light-emission. Meanwhile, the light-emission does not occur on the intersecting areas where the electrical potential is not formed, in which case the backgrounds in the back may be viewed transparently.

Indium tin oxide (ITO) may be used in the first and the second transparent electrode 113-1, 115-1. Further, new material such as graphene may be used, according to another exemplary embodiment. Graphene refers to a material having the transparent properties in which carbon atoms are connected to each other and form the planar structure in a bee-hive shape. Besides, the transparent organic light-emitting layer 114-1 may be implemented with various different materials.

Figure 4A:
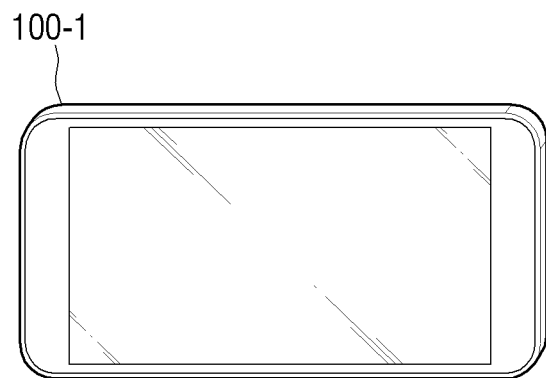
FIGS. 4A and 4B illustrate a method of combining and using a plurality of display apparatuses, according to various exemplary embodiments.
Figure 4A:
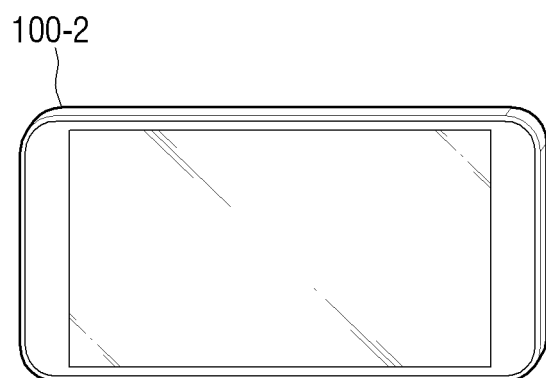
Figure 4A:
Figure 4A:
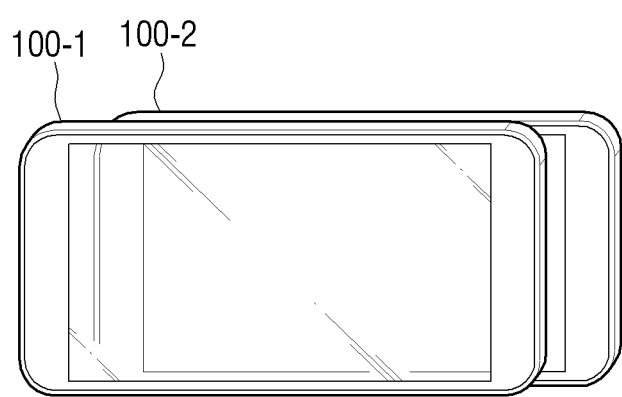
Figure 4B:
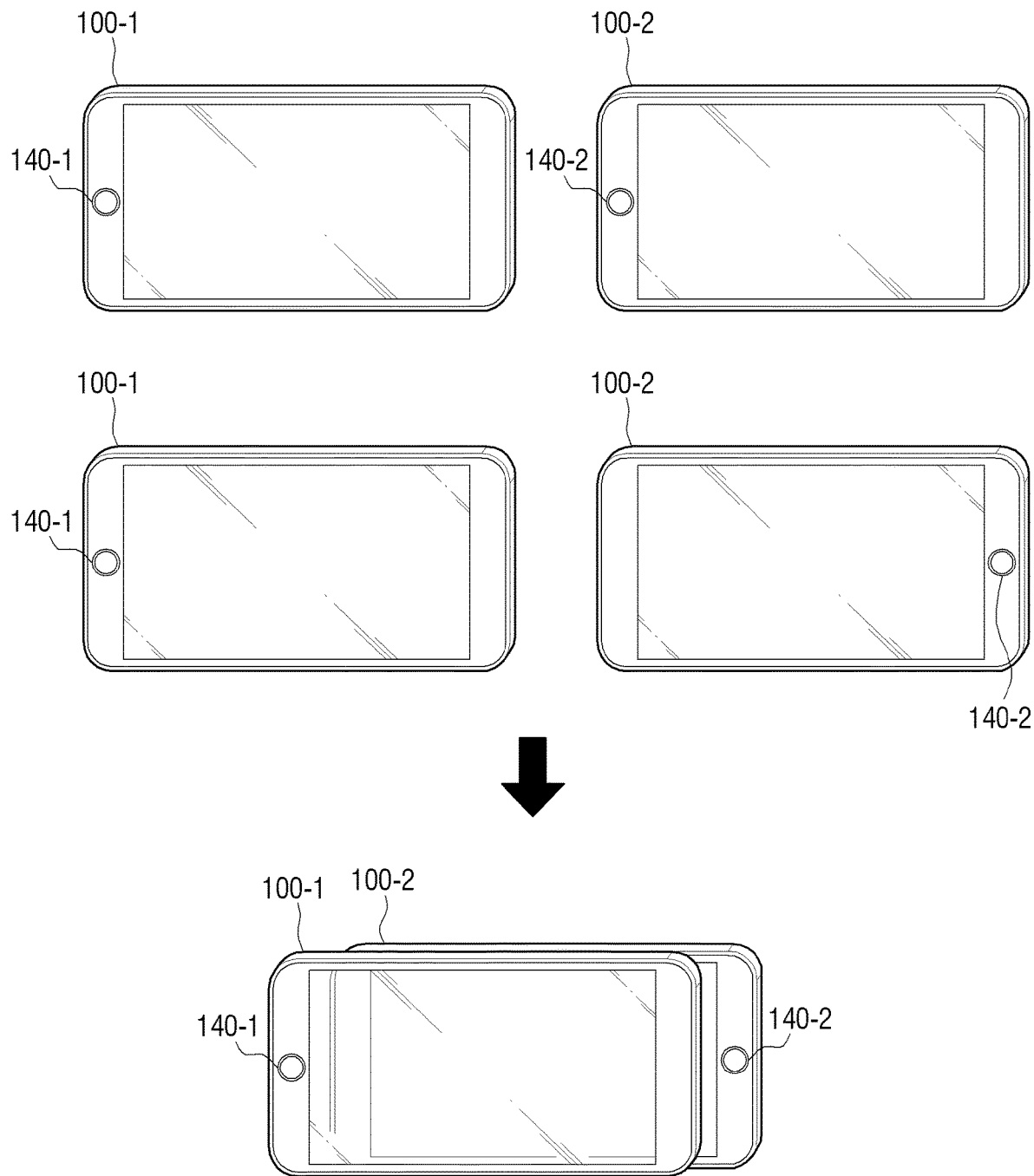

FIGS. 4A and 4B illustrate a method of combining and using a plurality of display apparatuses, according to various exemplary embodiments.

According to an embodiment illustrated in FIG. 4A, the transparent display apparatus 100-1 and another transparent display 100-2 may not include the camera. In this case, the group play function using the camera may not be provided. The provided group play function may be a function of displaying 3D content or a function of displaying the content including front image and background image.

When the transparent display apparatus 100-1 and another display apparatus 100-2 communicate for interoperation with each other, such interoperation between the transparent display apparatus 100-1 and another display apparatus 100-2 may be performed on equal terms, according to an exemplary embodiment. However, this is merely one embodiments and the interoperation may be performed so that only one apparatus can have the control authority. Specifically, the transparent display apparatus 100-1 may control another display apparatus 100-2 to transmit and display 3D content. Furthermore, another display apparatus 100-2 may control the transparent display apparatus 100-1, according to another exemplary embodiment. The exemplary embodiment of transparent display apparatus 100-1 controlling another display apparatus 100-2 will be explained below in greater detail.

According to another embodiment illustrated in FIG. 4B, the transparent display apparatus 100-1 and another display apparatus 100-2 may include the first and the second cameras 140-1, 140-2. In this case, the transparent display apparatus 100-1 and another display apparatus 100-2 may provide the group play function using the first and the second cameras 140-1, 140-2 as well as group play functions provided in FIG. 4A. Specifically, in response to input of a command to photograph, the group play function, using the first and the second cameras 140-1, 140-2, may photograph an object by controlling the first camera 140-1, transmit the command to photograph to another display apparatus 100-2, receive a second image photographed in another display apparatus 100-2 through the interface 130, and combine the first image and the second image to create content, according to an exemplary embodiment. Further, the above group play function may be a function of displaying 3D content or a function of displaying the content including front image and background image.

Then when content is created, it is possible to additionally apply a function of creating a combined image by performing at least one of the size change and the color compensation regarding the image so as to correspond to at least one of the first image and the second image. This will be explained below in greater detail.

Meanwhile, the transparent display apparatus 100-1 and another display apparatus 100-2 may be arranged to overlap the first and the second cameras 140-1, 140-2. However, the transparent display apparatus 100-1 and another display apparatus 100-2 may be arranged so as not to overlap the first and the second cameras 140-1, 140-2. This will be explained below in greater detail.

Figure 5:
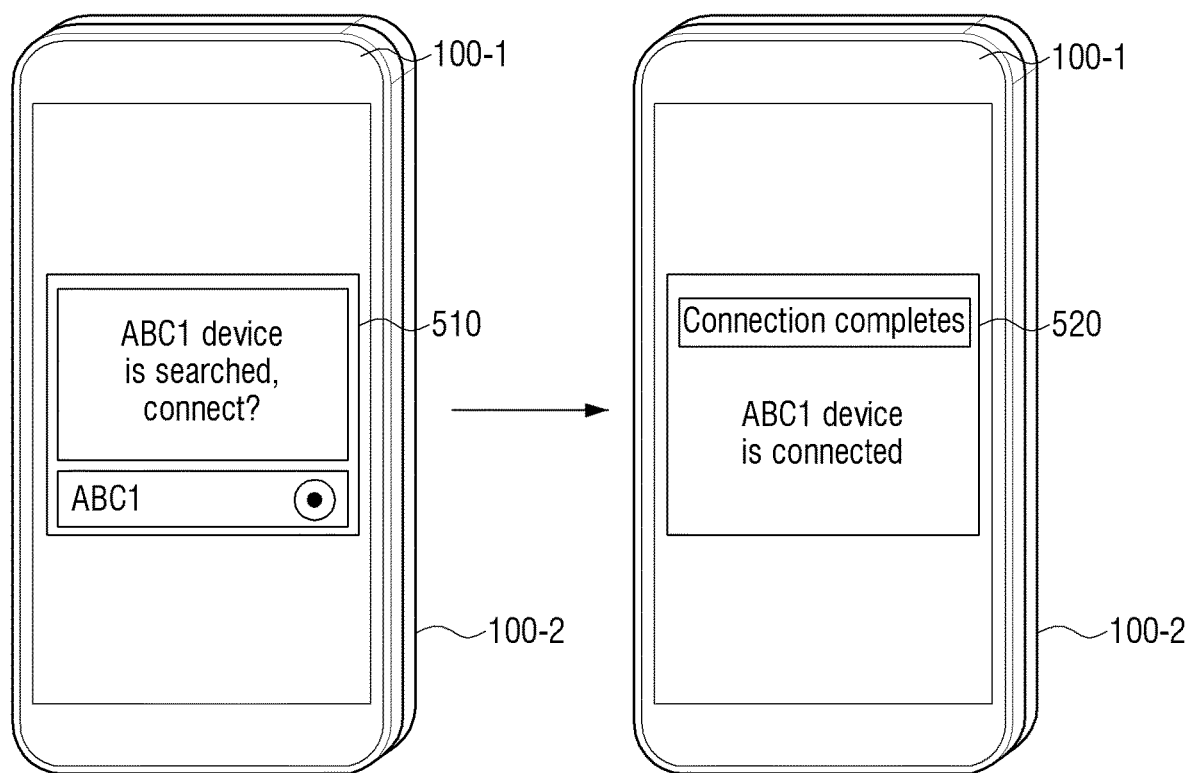
FIG. 5 illustrates a method of inquiring about possibility of interoperation by combining a transparent display apparatus and another display apparatus, according to an exemplary embodiment.

FIG. 5 illustrates a method of inquiring about a possibility of interoperation by combining the transparent display apparatus 100-1 and another display apparatus 100-2, according to an exemplary embodiment.

According to an embodiment illustrated in FIG. 5, when a user overlaps the transparent display apparatus 100-1 and another display apparatus 100-2, a message 510 inquiring about a possibility of interoperation with another display apparatus 100-2 may be displayed on the transparent display 110-1. In this process, a device name of another display apparatus 100-2 may be displayed on the transparent display 110-1, and a user may be provided with an option to connect to the display apparatus 100-2. However, this is merely one of embodiments, a device name set by a user or a device name set by a manufacturer during manufacture may be displayed. Under the message 510 inquiring about possibility of interoperation, a touch menu may be provided so that a user can input a command to interoperate.

Meanwhile, the transparent display apparatus 100-1 may sense the overlapping with another display apparatus 100-2. When the overlapping is being sensed, the transparent display apparatus 100-1 may perform communication with another display apparatus 100-2 and display a message inquiring about possibility of interoperation, according to an exemplary embodiment. However, this is merely one embodiment and the transparent display apparatus 100-1 may interoperate immediately when sensing the overlapping without displaying a message inquiring about possibility of interoperation.

Furthermore, when a user inputs a command to interoperate after the transparent display apparatus 100-1 and another display apparatus 100-2 overlap with each other, an interoperation approving message 520 may be displayed on the transparent display 110-1.

A device name of another display apparatus 100-2 interoperated with the transparent display apparatus 100-1 may be displayed on the first transparent display 110-1. However, this is merely one of embodiments and a device name set by a user or by a manufacturer during manufacture may be displayed.

Figure 6A:
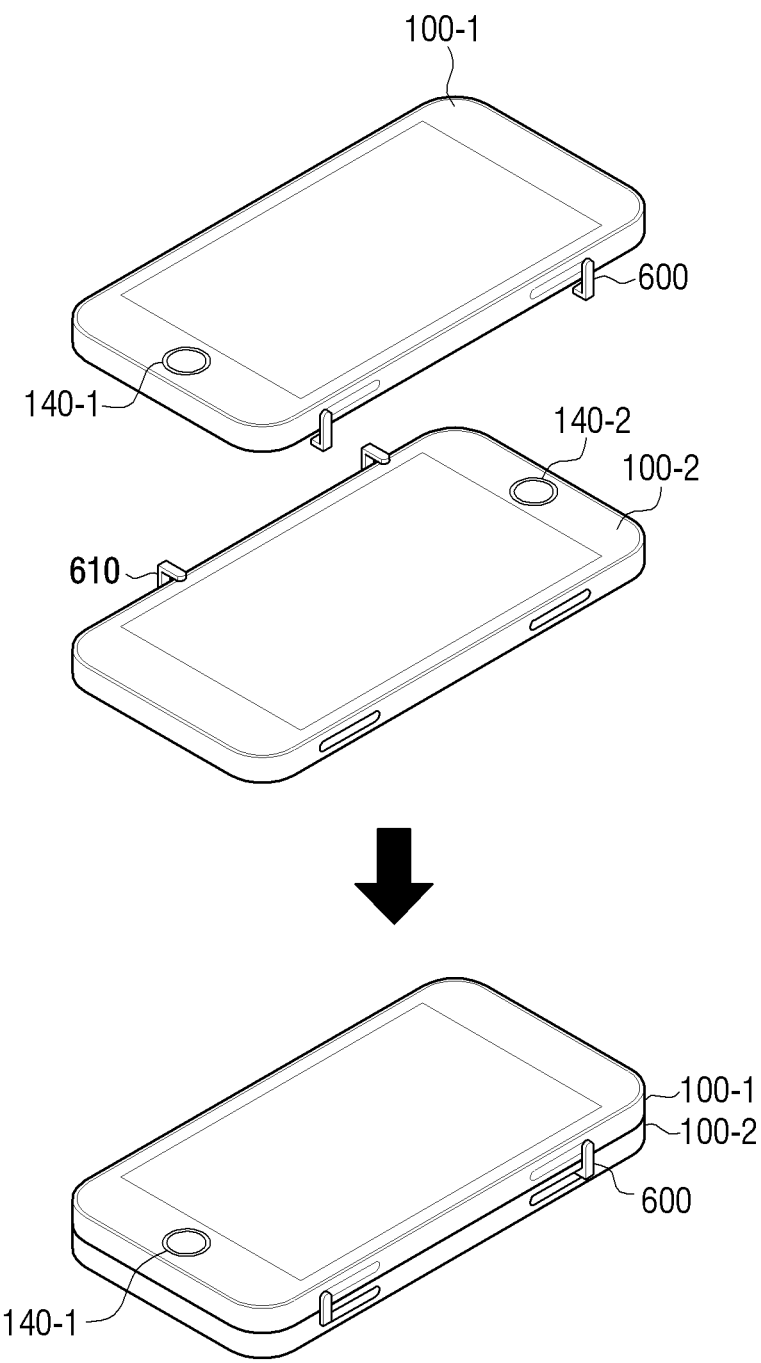
FIGS. 6A and 6B depict a view provided to explain a connector to connect a transparent display apparatus and another display apparatus, according to various exemplary embodiments.
Figure 6B:
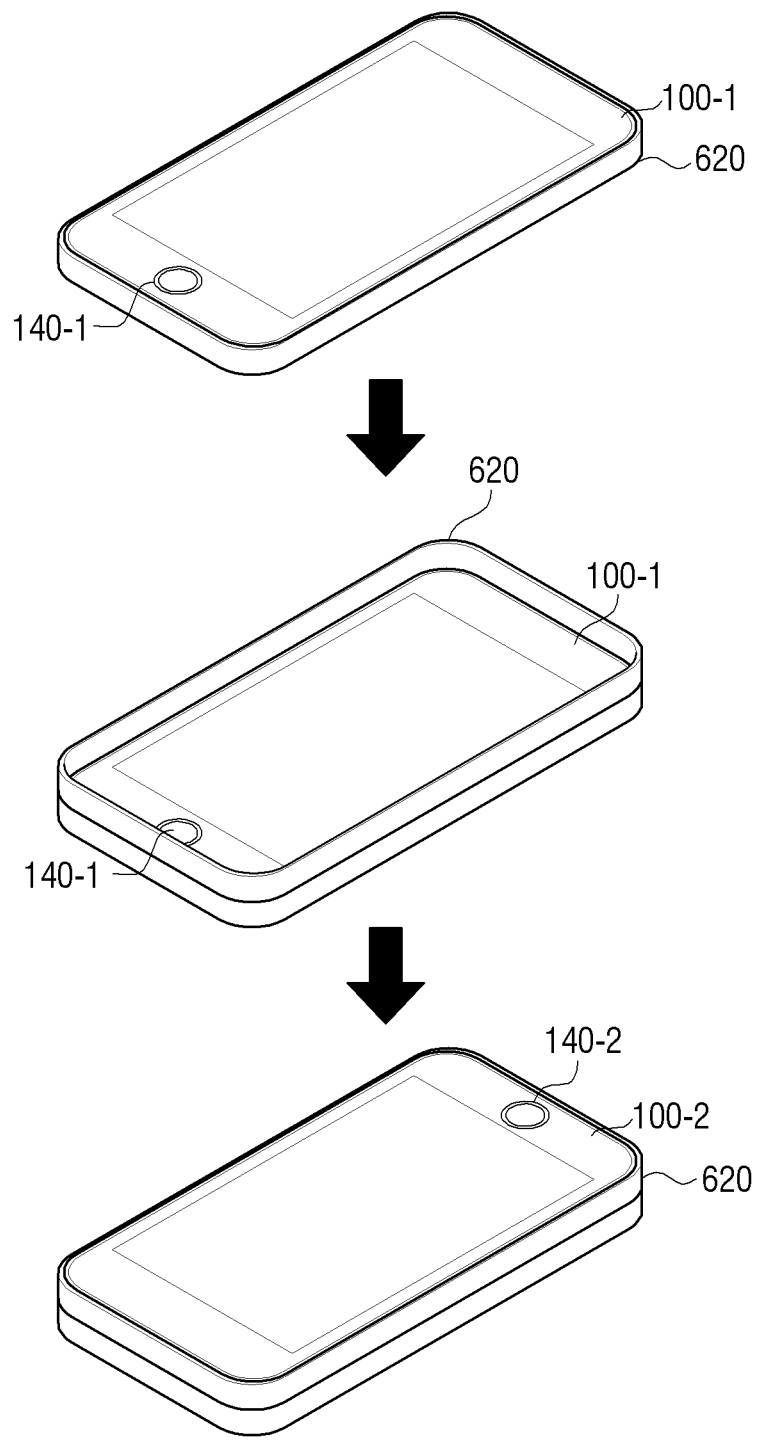

FIGS. 6A and 6B depict a view provided to explain a connector connecting the transparent display apparatus 100-1 and another display apparatus 100-2, according to various exemplary embodiments.

According to an embodiment illustrated in FIG. 6A, the transparent display apparatus 100-1 may be provided with a hook cap 600 on one side of the apparatus so that the transparent display apparatus 100-1 can overlap with another display apparatus 100-2. The hook cap 600 formed on the transparent display apparatus 100-1 may be connected to another display apparatus 100-2, and a groove may be formed on the opposite side to the side on which the hook cap 600 is formed so that the hook cap 610 of another display apparatus 100-2 can be connected. However, this is merely one of embodiments and the hook cap may be formed on only one of a plurality of the display apparatuses.

According to another embodiment illustrated in FIG. 6B, the transparent display apparatus 100-1 and another display apparatus 100-2 may connect to each other with a bumper case 620. The bumper case 620 may cover only an edge of the transparent display apparatus 100-1. Furthermore, the bumper case may be a flexible material such as rubber or silicone, according to an exemplary embodiment.

The bumper case 620 may cover only the transparent display apparatus 100-1 during normal times. Furthermore, when connected to another display apparatus 100-2, the bumper case may be in such a form that the folded portion may be unfolded to cover another apparatus. However, this is merely one of embodiments and many other forms of bumper cases may be used to achieve the same results. Accordingly, depending on situations, the bumper case may be formed so as to be expanded to cover another apparatus.

Although FIGS. 6A and 6B illustrate that the cameras 140-1, 140-2 are provided, the above embodiment may be uniformly applied to an embodiment in which the cameras 140-1, 140-2 are not provided.

Meanwhile, it is described above that the transparent display apparatus 100-1 and another display apparatus 100-2 may communicate through the interface 130, and when the interface 130 is a wired interface, the interface may be implemented in the hook cap or the bumper case.

It is described above that the transparent display apparatus 100-1 and another display apparatus 100-2 may communicate, and the two apparatuses 100-1, 100-2 may interoperate with each other. The following description will explain the various group play functions provided to a user after the interoperation. The group play functions may include 3D content creating function through simultaneous photographing, 3D content displaying function, and a displaying function of the content including front image and background image.

Figure 7:
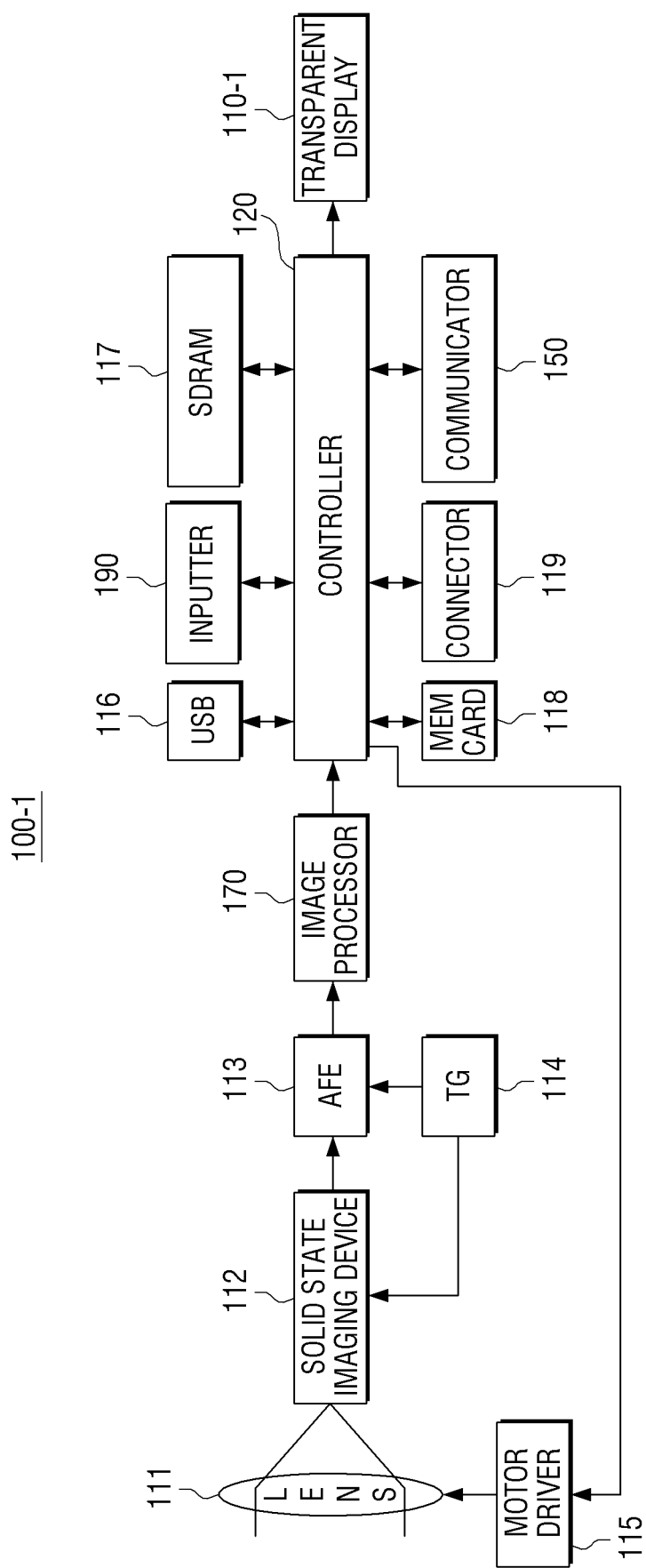
FIG. 7 is a block diagram of circuit configuration of a transparent display apparatus including a camera, according to an exemplary embodiment.

FIG. 7 is a block diagram of circuit configuration of the transparent display apparatus 100-1 including the camera 140-1, according to an exemplary embodiment.

Referring to FIG. 7, the transparent display apparatus 100-1 including the camera 140-1 includes a lens 111, a solid state imaging device 112, a timing generator (TG; 114), an analog front end (AFE; 113), a motor driver 115, a connector 119, an inputter 190, an image processor 170, a communicator 150, a controller 120, a first transparent display 110-1, an SDRAM module 117, a memory card 118, and a USB module 116.

The lens 111 is configured to receive the light reflected from an object, and includes a single focal lens. Although not illustrated, the transparent display apparatus 100-1 may further include an aperture.

The aperture is configured to adjust an amount of the light entering through the lens 111 and into an image sensor. The aperture has a mechanical structure that can gradually increase or decrease the size of an opening so as to adjust the amount of the incident light. The aperture may indicate the degree of the openness with a value of the aperture, which is referred to as an "F number". Since the degree of the openness becomes greater as the F number becomes smaller, bright images may be created with a greater amount of the incident light.

The solid state imaging device 112 is configured to focus an image of the object passing through the lens 111. The solid state imaging device 112 includes a plurality of pixels arranged in a matrix form. A plurality of the pixels may respectively accumulate optical charges according to the incident light, and output the image formed by the optical charges as electrical signals. The solid state imaging device 112 may include a complementary metal oxide semiconductor (CMOS) or a charge coupled device (CCD).

Furthermore, the solid state imaging device 112 may include a photo diode (PD), a transmission transistor (TX), a reset transistor (RX), and a floating diffusion node (FD), according to an exemplary embodiment. The photo diode (PD) may create and accumulate corresponding optical charges to the optical image of the object. The transmission transistor (TX) may transmit the optical charges generated in the photo diode (PD) to the floating diffusion node (FD) in response to the transmission signals. The reset transistor (RX) may discharge the electrical charges stored in the floating diffusion node (FD) in response to the reset signals. The electrical charges stored in the floating diffusion node (FD) may be output before the reset signals are applied. Regarding CDS image sensor, correlated double sampling (CDS) process may be performed. Furthermore, the ADC may convert the analog signals processed with CDS into digital signals.

The TG 114 may output timing signals to read out pixel data of the solid state imaging device 112. The TG 114 may be controlled by the controller 120.

The AFE 113 may perform sampling and digitalizing the electrical signals of the object output from the solid state imaging device 112. The AFE 113 may be controlled by the controller 120.

However, as described above, the constitution may be established with different components as replacements for the AFE 113 and the TG 114. Specifically, when the solid state imaging device 112 is implemented to be CMOS type, the above components may not be necessary.

The motor driver 115 may adjust the focus by driving the lens based on the information calculated with the readout of phase differential pixels. However, when the transparent display apparatus 100-1 is implemented to be a smart phone or a cellular phone, the focus may be adjusted by the software without driving the lens for focusing, and the motor driver 115 may not be provided.

The image processor 170 may process raw image data under control of the controller 120, and record on SDRAM 117. Furthermore, the image processor 170 may deliver the image-processed data of SDRAM 117 to the first transparent display 110-1.

When performing the auto-focusing by using the phase difference, the image processor 170 may divide the signals outputted from the solid state imaging device 112 and sampled by AFE 113 into signals to create images (signals readout from ordinary pixels) and signals to calculate the phase difference (signals readout from phase differential pixels).

The image processor 170 may process raw image data into YCbCr data. The raw image data may be initially compensated regarding pixel defects with a compensating circuit. The compensating circuit may compensate the pixel defects by referring to a compensation table. Addresses of the pixels having the defects are registered on the compensation table. The compensating circuit may compensate the pixels matching the registered addresses based on the surrounding pixels.

The image processor 170 may include an OB clamp circuit determining the black level of an image. The solid state imaging device 112 may have optical black (OB) area; OB clamp circuit may extract an average value of the signals on the OB area, and determine the black level through the differences between the pixels.

Further, the image processor 170 may perform adjustment of the sensitivity ratio which is different per color by using a sensitivity ratio adjusting circuit. The sensitivity ratio adjusting circuit may adjust the sensitivity of red (R), green (G), blue (B) colors under the standard optical source. Generally, a gain value of G may be fixed to 1, and the sensitivity of R, B may be adjusted based on the same.

When a still image is output, image data may be output through an outputting buffer after the sensitivity ratio is adjusted. In this case, because an image may be created according to an interlace method, next process may not be immediately performed. However, when a live view image is output, the next process may immediately follow because an image may be created according to a progressive method.

Furthermore, the image processor 170 may perform the skip-readout to readout some of the pixel lines and skip the other pixel lines by using a horizontal skip readout circuit. Thus, a pixel number of a raw image may decrease.

The image processor 170 may adjust the white balance (WB) regarding image data by using a WB adjusting circuit. Because the spectrum distribution of the light may be different according to the photographing environment, even a white object may not be expressed to be white when photographed. The signal level may be adjusted by setting different gain values on R, G, B pixels.

Furthermore, the image processor 170 may perform gamma adjusting regarding the image data. The grey scale converting suitable for outputting of the first transparent display 110-1 may be performed through the gamma adjusting.

The image processor 170 may generate conventional color image signals including three colors per one pixel from the bayer signals including one color per one pixel by using a color interpolating circuit.

Furthermore, the image processor 170 may convert the color dimension suitably for outputting and compensate the colors by using a color-converting/color-compensating circuit. According to necessity, a look up table (LUT) may be used. The image data may be YCbCr data after the color-conversion/color-compensation.

The image processor 170 may adjust the size by converting the resolution with a resolution converting circuit.

The image processor 170 may process a dimensional filter regarding image data by using a dimensional filter circuit. The highlighting regarding the edge of Y signals may be performed, and low pass filter (LPF) processing regarding Cb/Cr signals may be performed.

Further, the image processor 170 may convert Cb/Cr signals into YCbCr 4:2:2 image data by performing the skip-readout regarding Cb/Cr signals with CbCr skip readout circuit. The image data may be output through the outputting buffer, and registered on SDRAM 117 through a bus.

Regarding a still image, the readout may be performed according to the interlace method. In this case, the color interpolating may not be directly performed because neighboring pixel lines are not formed. Thus, when a foregoing processing completes, the still image may be stored on SDRAM 117 in the progressive form by adjusting the pixel line order through the outputting buffer.

However, an embodiment of the invention may not limit the interlace method regarding a still image, and may be implemented to readout according to the progressive method.

Meanwhile, a preview image showing the image in reduced size after the photographing, or a thumbnail image may be necessary to be created when using a still image. Data of some pixels may be omitted to create the above image, such as skip-readout.

The image processor 170 may interpolate phase differential pixels with ordinary pixel values by using an AF signal interpolating circuit. Because the phase differential pixels are positioned among ordinary pixels, resolution blurring may occur. Thus, interpolating may be performed by using surrounding ordinary pixels.

Based on the above described processing of the image processor 170, the image processor 170 may adjust attributes of the other images uniformly based on the attributes of one image among a plurality of images obtained through the transparent display apparatus 100-1 and another display apparatus 100-2 under control of the controller 120.

Meanwhile, the phase differential pixel signals divided in a dividing circuit may be recorded on the SDRAM 117 through the first bus. Since the readout and the dividing may be performed for all the pixels, each phase differential pixel signals may be accumulated for a short time.

The stored phase differential pixel signals may be input to a phase differential calculating circuit through the first bus. The phase differential calculating circuit may calculate the phase differences between the phase differential pixels, and moving direction and moving amount of the focusing lens. The calculated moving amount may be temporarily recorded on a register within the phase differential calculating circuit, and the controller 120 (CPU) may read the same.

The controller 120 may generate controlling commands by reading the calculated moving amount of the focusing lens. Furthermore, the controller 120 may deliver the generated controlling commands to the motor driver 115 and drive the focusing lens.

The JPEG codec may compress YCbCr data. Furthermore, the compressed image data may be recorded on SDRAM 117. The controller 120 may read the compressed image data recorded on SDRAM 117 and record the same on the memory card 118, completing the image creating process.

The communicator 150 is configured to perform communication with the other devices. The communicator 150 may be implemented with the various wireless communication technologies. Mainly, the communicator 150 may include a near field communication module to directly perform communication, without a mediating apparatus between the devices.

The connector 119 may be used to affix the device with the other devices. Further, the wire communication may be performed through the connector 119. Embodiments in which the connector 119 is used with the other devices will be described below in greater detail.

The communicator 150 may include at least one of a Wi-Fi direct communication module, a Bluetooth module, a infrared data association module (IrDA), a near field communication module (NFC), and a Zigbee module.

Also, applying another communication technology method may not be excluded. For example, the communicator 150 may include at least one of the cellular communication module, 3 Generation (3G) mobile communication module, 4 Generation (4G) mobile communication module, and 4G long term evolution (LTE) communication module.

The USB module 116 may be provide to interface with external devices. The USB module 116 may process the trans-receiving of image data when connecting to PC or other external devices through USB cables. Furthermore, USB module 116 may process the trans-receiving of the firmware to perform firmware upgrading.

The inputter 190 is configured to receive user input. The inputter 190 may include one or more buttons. Furthermore, the inputter 190 may include a touch screen positioned on the first transparent display 110-1, according to another exemplary embodiment.

The inputter 190 may receive user commands to adjust the magnification of photographing images as well as image capturing commands.

The photographing magnification adjusting commands may be user commands to push the button included in the transparent display apparatus 100-1. For example, if the inputter 190 includes the upper button and the lower button, the live view images may be expanded in response to input of a user command to push the upper button while the live view is displayed.

Furthermore, the inputter 190 may be implemented as a touch screen, and may receive a user command to adjust the magnification of photographing images through the first transparent display 110-1.

SDRAM (synchronous dynamic RAM) 117 may be used to store images or perform operation regarding images with CPU. According to an embodiment, DDR SDRAM may be used by outputting from both an ascending end and a descending end regarding a system clock, which increasing the outputting to be twice compared to the outputting only from the ascending end.

The memory card 118 may include a flash memory, and may also be implemented in a card form that can be attached and detached to the transparent display apparatus 100-1. Furthermore, the memory card 118 may store the photographed image files.

The above embodiments are described based on the form in which the transparent display apparatus 100-1 and another display apparatus 100-2 may be fixedly established on preset positions within the cameras 140-1, 140-2, according to an exemplary embodiment. However, the transparent display apparatus 100-1 and another display apparatus 100-2 may be arranged by adjusting the overlapping area gradually.

The following description will further explain the group play functions that can be provided to a user by the transparent display apparatus 100-1 and another display apparatus 100-2 including the cameras 140-1 and 140-2 respectively.

FIGS. 8A, 8B, 8C and 8D illustrate a method of providing a guide to combine the transparent display apparatus 100-1 and another display apparatus 100-2 including the second transparent display 110-2, according to various exemplary embodiments.

The 3D content may be created when the photographing is performed by using the first and the second cameras 140-1, 140-2. However, according to distance differences between the first and the second cameras 140-1, 140-2, dimensional feeling of 3D content may be different. Thus, the transparent display apparatus 100-1 and another display apparatus 100-2 may provide a guiding function for a user regarding the above. Specifically, a message or a guide to combine the apparatuses may be provided when a user combines the transparent display apparatus 100-1 and another display apparatus 100-2.

Figure 8A:
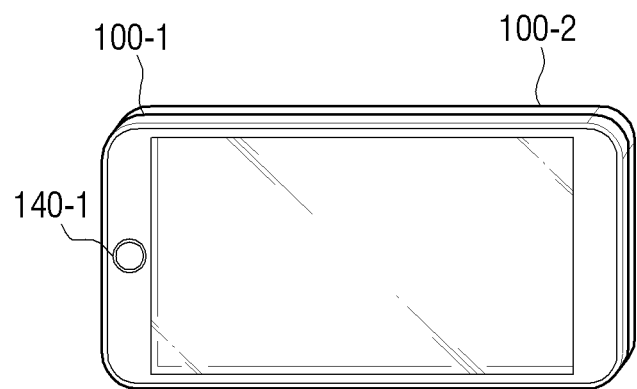
FIGS. 8A, 8B, 8C and 8D illustrate a method of providing a guide to combine a transparent display apparatus and another display apparatus including a second transparent display, according to various exemplary embodiments.

According to an embodiment of FIG. 8A, the transparent display apparatus 100-1 may be arranged to entirely overlap with another display apparatus 100-2. In this case, the first camera 140-1 of the transparent display apparatus 100-1 may be shielded by the second camera 140-2 of another display apparatus 100-2. Further, the photographing may be performed through the second transparent display 110-2 of another display apparatus 100-2.

Figure 8B:
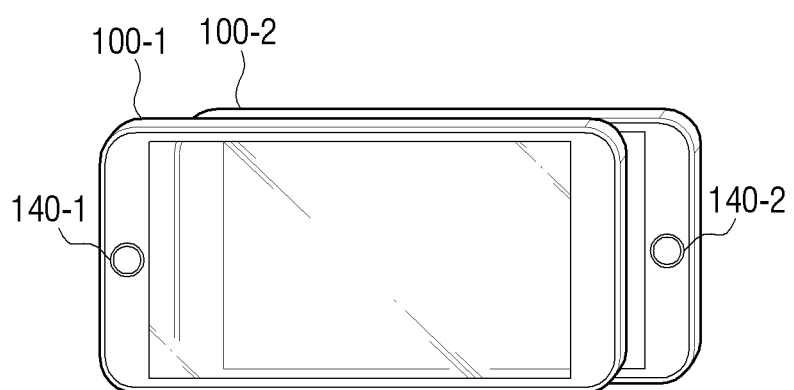
Figure 8C:
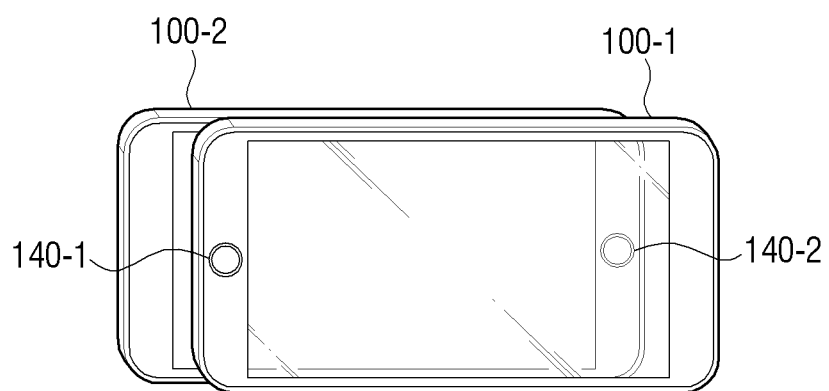

According to another embodiment of FIGS. 8B and 8C, the transparent display apparatus 100-1 may be arranged to partly overlap with another display apparatus 100-2. Furthermore, the first camera 140-1 of the transparent display apparatus 100-1 may perform photographing without overlapping with another display apparatus 100-2, as shown in FIG. 8B, or through the second transparent display 110-2 of another display apparatus 100-2, as shown in FIG. 8C.

Referring to FIGS. 8A to 8C, a message informing the above to a user may be displayed on a display of any of the transparent display apparatus 100-1 and another display apparatus 100-2. For example, referring to FIG. 8A, the two apparatuses may overlap with each other completely, and the first camera 140-1 may be shielded by the second camera 140-2. Thus, a message informing the user that the first camera 140-1 cannot capture images may be displayed. When the first camera 140-1 is not shielded by the second camera 140-2, a message informing that colors may be different by photographing through another display 110-2 may be displayed.

Figure 8D:
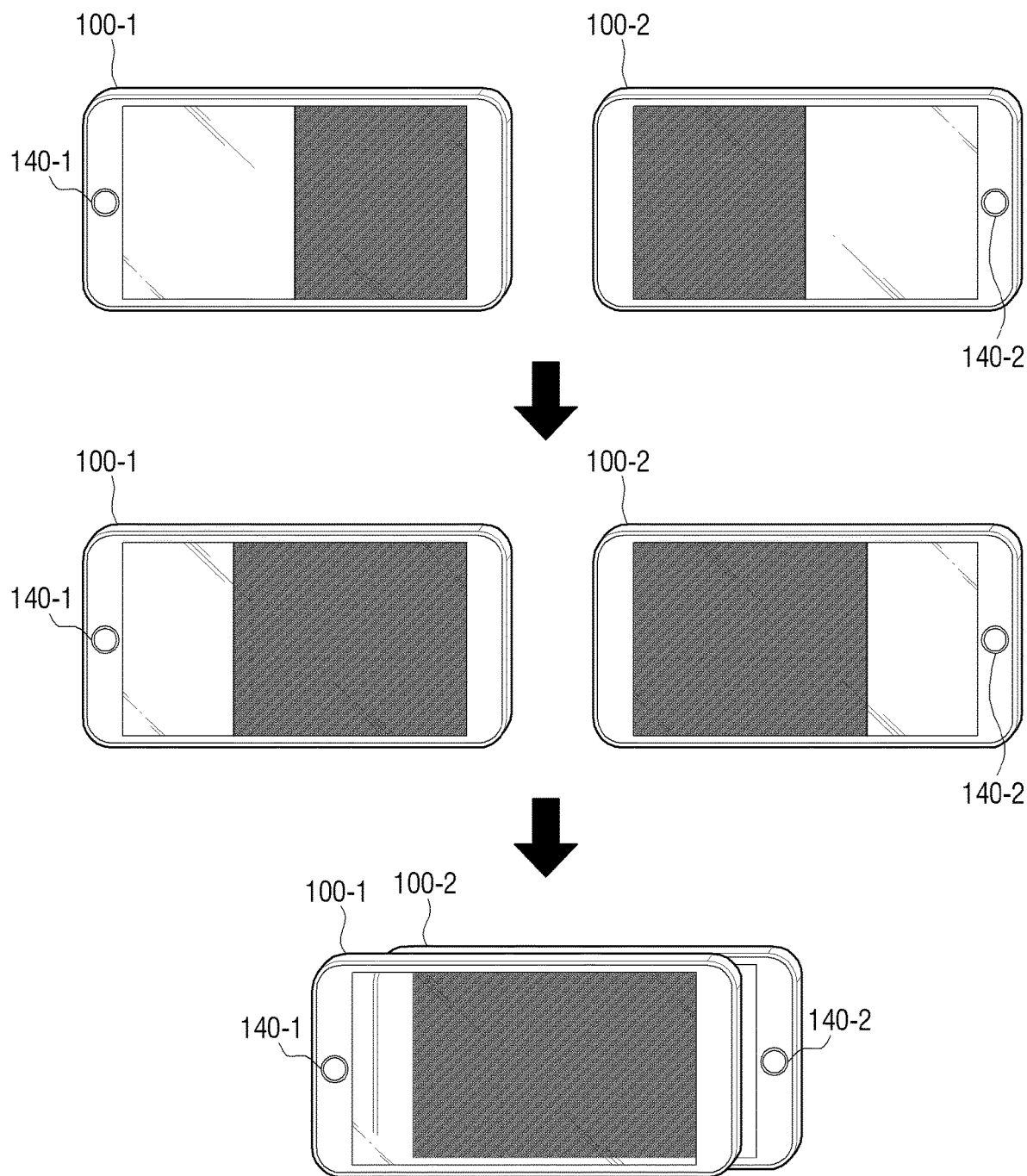

According to an embodiment of FIG. 8D, the controller 120 may control the transparent display to display the graphic guide to encourage gradually adjusting the size of the overlapping area on at least one of the first transparent display 110-1 and the second transparent display 110-2. In this process, the graphic guide may indicate the distance between the first and the second cameras 140-1, 140-2 to be distance between two eyes of a human. However, this is merely an exemplary embodiment. It may be constituted to indicate various intervals. As the size of the overlapping area becomes smaller, the dimensional feeling may be enhanced when creating 3D content. Furthermore, as the size of the overlapping area becomes bigger, the dimensional feeling may be reduced when creating 3D content. Thus, user convenience and satisfaction can be enhanced through the above functions.

Figure 9:
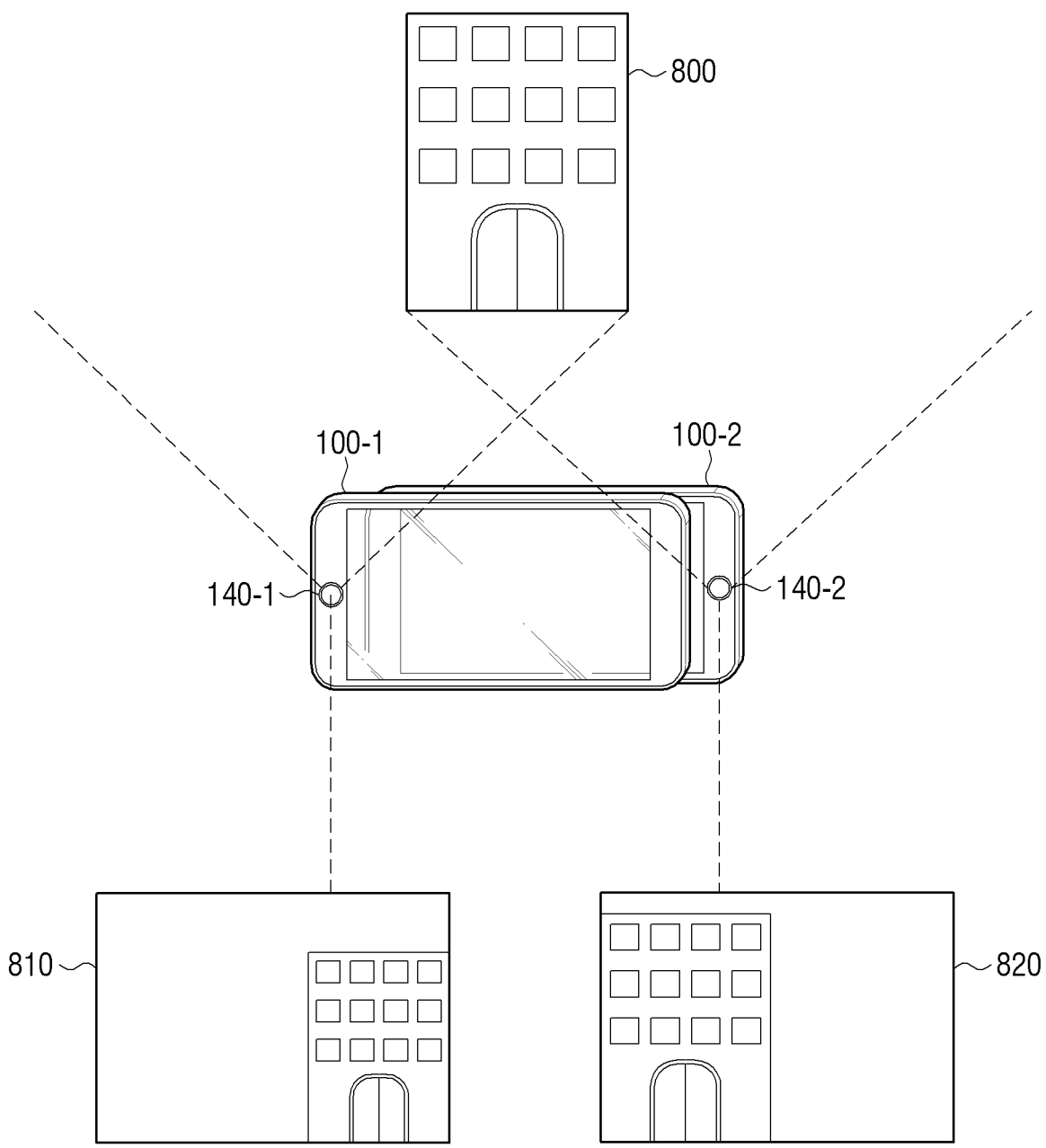
FIG. 9 illustrates a method of creating and compensating 3D content by combining a transparent display apparatus and another display apparatus, according to an exemplary embodiment.

FIG. 9 illustrates a method of creating and compensating 3D content by combining the transparent display apparatus 100-1 and another display apparatus 100-2, according to an exemplary embodiment.

According to an embodiment of FIG. 9, the transparent display apparatus 100-1 and another display apparatus 100-2 may include the first and the second cameras 140-1, 140-2 having the uniform view angles. However, this is merely an exemplary embodiment and the view angle may not be uniform. The following description will explain that the view angle is uniform to each other in the cameras.

The transparent display apparatus 100-1 and another display apparatus 100-2 may overlap and interoperate with each other. The transparent display apparatus 100-1 may be positioned more toward the left compared to another display apparatus 100-2. Thus, regarding an image 810 by the first camera 140-1, a building 800 may be positioned on the right side within the image. Furthermore, another display apparatus 100-2 may be positioned more toward the right compared to the transparent display apparatus 100-1. Thus, regarding a photographed image 820, the building 800 may be positioned on the left within the image.

The transparent display apparatus 100-1 may photograph the building 800 by controlling the first camera 140-1, and transmitting a command to photograph to another display apparatus 100-2 in response to an input of a command to photograph which is input by a user by controlling another display apparatus 100-2. In this case, the transparent display apparatus 100-1 and another display apparatus 100-2 may capture images simultaneously. However, this is merely an exemplary embodiment and the second camera 140-2 may capture the image after the first camera 140-1 by setting the time interval for image capture.

Furthermore, the controller 120 of the transparent display apparatus 100-1 may receive a second image photographed by another display apparatus 100-2 through the interface 130, and control the image processor 170 to create content by combining the first image and the second image. The created content may be 3D content or content including the front image and the background image.

When the created content is 3D content, the controller 120 of the transparent display apparatus 100-1 may establish the focus of the first camera 140-1 matching that of the second camera 140-2 in another display apparatus 100-2. When the created content is content including the front image and the background image, the controller 120 of the transparent display apparatus 100-1 may establish the focus of the first camera 140-1 matching that of the second camera 140-2 in another display apparatus 100-2, or control the focus of the first camera 140-1 in the transparent display apparatus 100-1 to be set on the front view, and the focus of the second camera 140-2 in another display apparatus 100-2 to be set on the back view.

Furthermore, multilayered content may be created by overlapping a plurality of the transparent display apparatus in addition to the transparent display apparatus 100-1 and another display apparatus 100-2. However, the following description will explain an embodiment by limiting the display apparatuses to only the transparent display apparatus 100-1 and another display apparatus 100-2.

According to an embodiment of FIG. 9, there may be viewpoint difference between the first and the second cameras 140-1, 140-2 based on the depth of the transparent display apparatus 100-1. Specifically, referring to FIG. 9, the second camera 140-2 may be positioned nearer to the building compared to the first camera 140-1. Furthermore, the first camera 140-1 may be arranged so as not to overlap another display apparatus 100-2 in FIG. 9. However, according to another embodiment, when another display apparatus 100-2 includes the second transparent display 110-2, the first camera 140-1 may capture images through the second transparent display 110-2 by completely overlapping the transparent display apparatus 100-1 and another display apparatus 100-2.

The size of the photographed object may be differently expressed according to the viewpoint difference of the cameras. The colors of the object may be differently photographed when another display apparatus 100-2 includes the second transparent display 110-2 and one camera captures the image through the transparent display of another apparatus by completely or partially overlapping the transparent display apparatus 100-1 and another display apparatus 100-2, or when there may be difference in the positions of the cameras (e.g., one camera positions under the sunlight while the other camera positions under the shadow).

The transparent display apparatus 100-1 may receive the second image from another display apparatus 100-2, and compare the second image with the first image photographed by the first camera 140-1 based on the command to photograph. The first image may be temporarily stored on SDRAM 117 as a photographed image by the first camera 140-1 of the transparent display apparatus 100-1, or stored in storage 155 (see FIG. 17).

The controller 120 of the transparent display apparatus 100-1 may control the image processor 170 to adjust the difference by comparing the first and the second image. In the photographed image 820 by another display apparatus 100-2 of FIG. 9, the building 800 may be photographed bigger than the building 800 in the image 810 photographed by the transparent display apparatus 100-1. The image processor 170 may perform conversion so as to correspond to the image 820 photographed by another display apparatus 100-2, by cutting one part from the image 810, according to an exemplary embodiment.

Furthermore, when another display apparatus 100-2 includes the second transparent display 110-2 and one camera captures the image through the transparent display of another apparatus by completely or partially overlapping the transparent display apparatus 100-1 and another display apparatus 100-2, or when the colors are photographed differently because there is difference in the positions of the cameras, the controller 120 may control the image processor 170 to perform color compensation by comparing the general color sensitivity of the images.

A plurality of the compensated images may be created to be 3D content or content including the front image and the background image. The created content may be stored on the storage 155. For example, the image processor 170 may create 3D content using one of the first and the second image as left-eye image and the other as right-eye image.

Figure 10A:
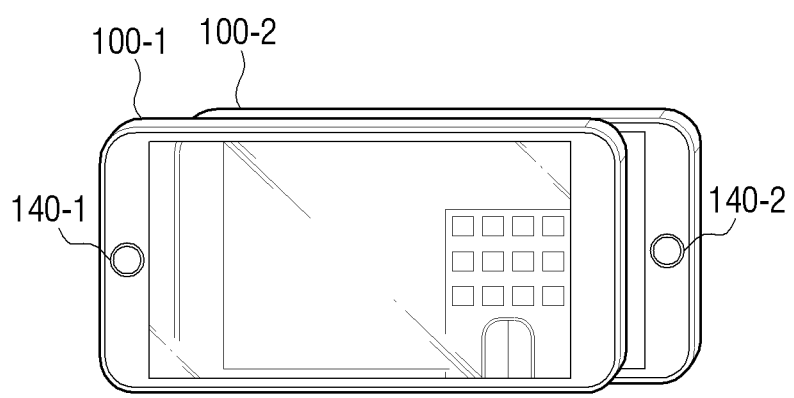
FIGS. 10A and 10B illustrate a method of displaying 2D content on a transparent display apparatus and another display apparatus including a second transparent display, according to various exemplary embodiments.
Figure 10B:
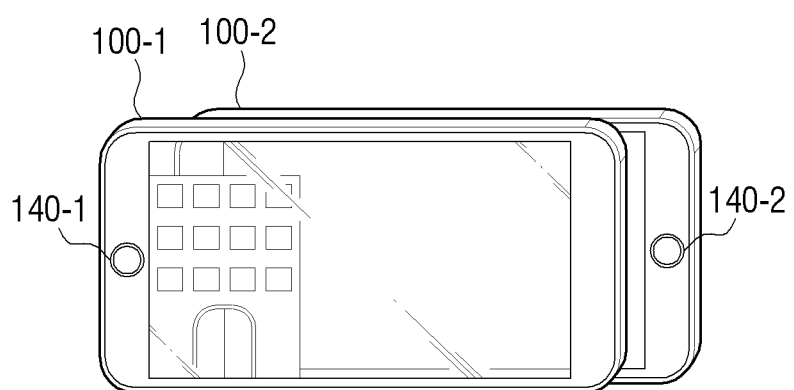

FIGS. 10A and 10B illustrate a method of displaying 2D content on the transparent display apparatus 100-1 and another display apparatus 100-2 including the second transparent display 110-2, according to various exemplary embodiments.

According to an embodiment of FIG. 10A, there may be two images photographed by the first and the second cameras 140-1, 140-2 regarding the building 800 of FIG. 9. The two images may be displayed on one of the first and the second transparent displays 110-1, 110-2. When the first transparent display 110-1 displays the two images, the second transparent display 110-2 may display the black color to enhance the visibility.

Furthermore, FIG. 10A illustrates the first image photographed by the first camera 140-1. However, this is merely an exemplary embodiments. As illustrated in FIG. 10B, the second image photographed by the second camera 140-2 may be displayed, according to another exemplary embodiment. Which image is displayed may be determined by default or determined in response to a user command.

Figure 11A:
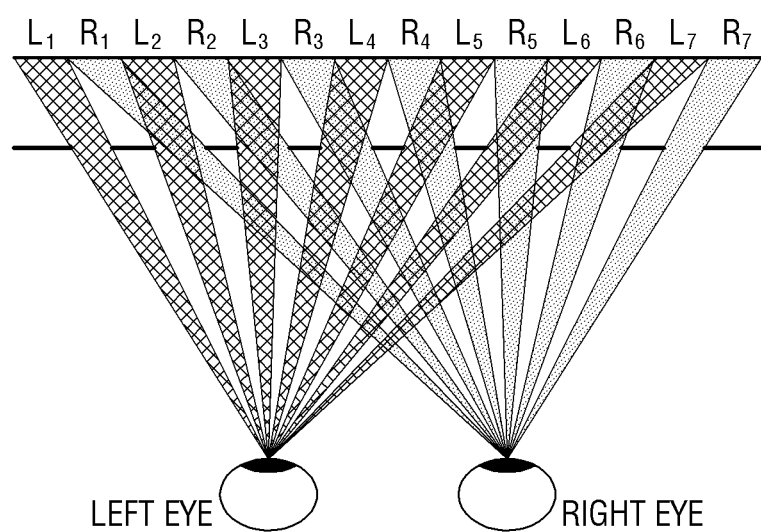
FIGS. 11A and 11B illustrate a principle of displaying 3D content on the transparent display apparatus and another display apparatus including the second transparent display, according to various exemplary embodiments.
Figure 11B:
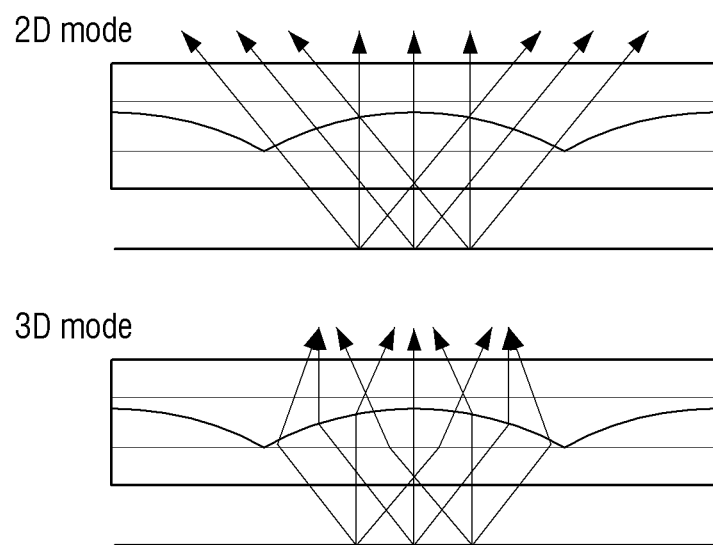

FIGS. 11A and 11B illustrate a principle of displaying 3D content on the transparent display apparatus 100-1 and another display apparatus 100-2 including the second transparent display 110-2 according to various embodiments.

According to an embodiment of FIG. 11A, 3D content may be displayed by using the transparent display apparatus 100-1 and another display apparatus 100-2 including the second transparent display 110-2. 3D content may be previously stored in the storage 155, or may be content photographed by using the first and the second cameras 140-1, 140-2.

Referring to FIG. 11A, in response to input of a user command to play back 3D content, the controller 120 may control so that 3D content screen combining left-eye image and right-eye image of 3D content are displayed on one of the first and the second transparent display 110-1, 110-2, and the barrier screen corresponding to 3D content screen is displayed on the other of the first and the second transparent display 110-1, 110-2.

Specifically, the first transparent display 110-1 may display the barrier screen, and the second transparent display 110-2 may display 3D content screen combining left-eye image and right-eye image of 3D content. A user's left eye may view only the left-eye image displayed on the second transparent display 110-2, and a user's right eye may view only the right-eye image displayed on the second transparent display 110-2.

The above is one of the general methods of displaying non-glasses 3D content. However, this is merely one of embodiments. The above may be implemented to be the method of displaying the barrier screen on the second transparent display 110-2, which enhances the visibility.

According to another embodiment of FIG. 11B, 3D content may be displayed by using the transparent display apparatus 100-1 and another display apparatus 100-2 including the second transparent display 110-2.

Referring to FIG. 11B, 2D-3D switching lens filter may be attached to the first transparent display 110-1 of the transparent display apparatus 100-1. In response to an input of a command to play back 3D content, 2D-3D switching lens filter may operate as a filter by applying the voltage.

Specifically, when the voltage is not applied to the 2D-3D switching lens filter, the light towards a user's eyes may not refract. Thereby, a user may view 2D content. However, when the voltage is applied to the 2D-3D switching lens filter, the light toward a user's eyes may refract.

When the light toward a user's eyes refracts, the second transparent display 110-2 may display a 3D content screen combining left-eye image and right-eye image of the 3D content, so that a user's left eye can view only the left-eye image displayed on the second transparent display 110-2, and a user's right eye can view only the right-eye image displayed on the second transparent display 110-2 through the filter. 2D and 3D content may be provided to a user when the first and the second transparent display 110-1, 110-2 are used according to the above method.

Figure 12A:
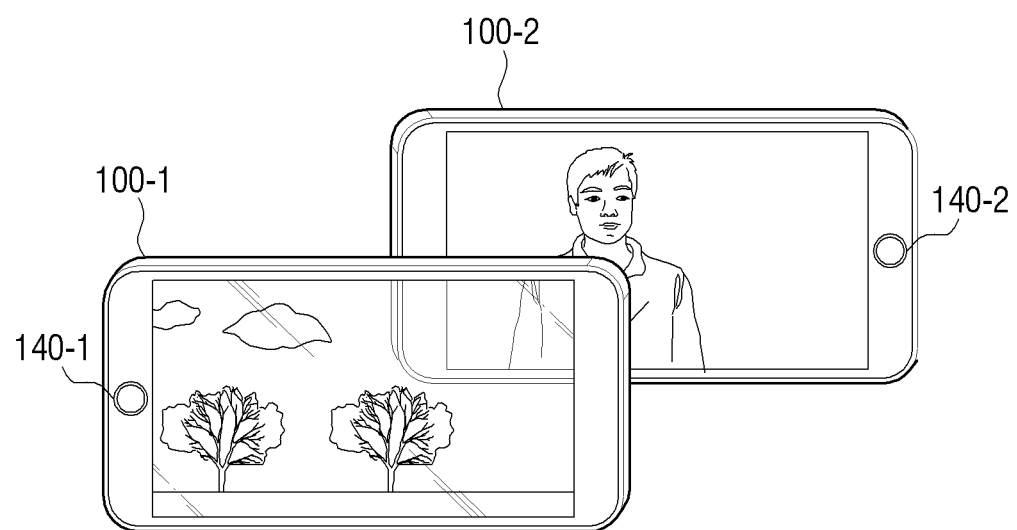
FIGS. 12A and 12B illustrate a method of displaying content including front image and background image on a transparent display apparatus and another display apparatus including a second transparent display, according to various exemplary embodiments.
Figure 12B:
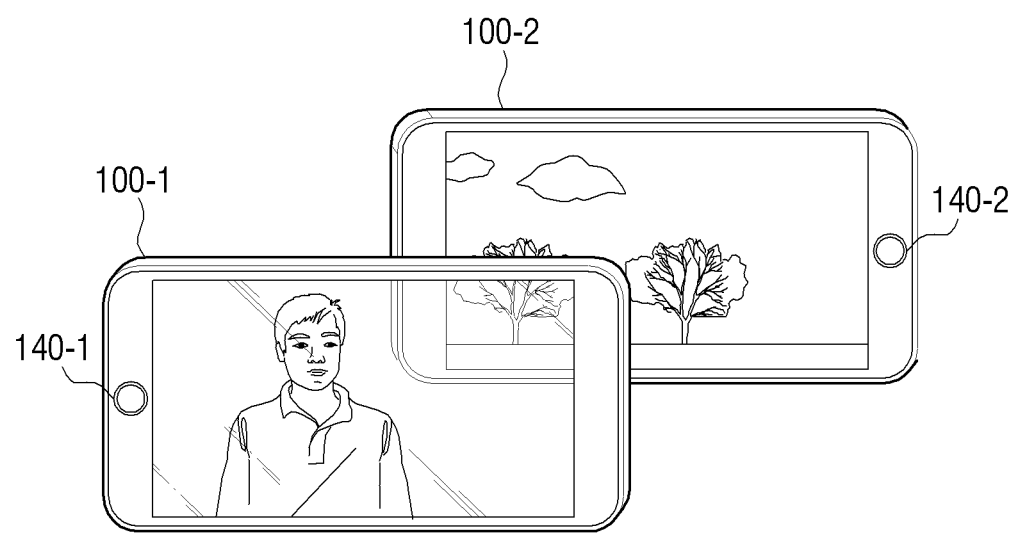

FIGS. 12A and 12B illustrate a method of displaying the content including front image and background image on the transparent display apparatus 100-1 and another display apparatus 100-2 including the second transparent display 110-2, according to various exemplary embodiments.

When a user inputs a command to play back the content including front image and background image according to an embodiment of FIG. 12A, the controller 120 may control so that the front image is displayed on the first transparent display 110-1 and the background image is displayed on the second transparent display 110-2. However, this is merely an exemplary embodiments. As illustrated in FIG. 12B, the controller 120 may control so as to display the front image and the background image, contrary to the above. Further, multilayered content may be displayed by overlapping a plurality of the transparent display apparatuses in addition to the transparent display apparatus 100-1 and another display apparatus 100-2.

Figure 13:
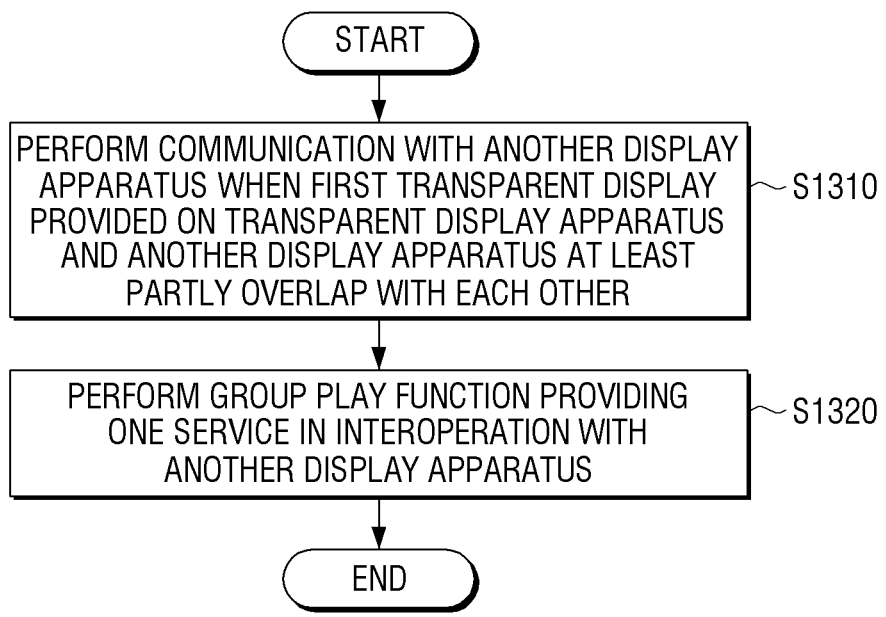
FIG. 13 is a flowchart provided to explain a group play performing method of a transparent display apparatus, according to an exemplary embodiment.

FIG. 13 is a flowchart provided to explain a group play performing method in the transparent display apparatus 100-1, according to an exemplary embodiment.

According to the group play performing method in the transparent display apparatus of FIG. 13, communication may be performed with another display apparatus when the first transparent display provided in the transparent display apparatus and another display apparatus at least partly overlap with each other at S1310. The connecting communication may be automatically performed by sensing another display apparatus.

At S1320, the group play function of providing one service may be performed in interoperation with another display apparatus. The interoperation with another display apparatus may be automatically performed, or may be performed by inputting a command to interoperate by a user.

Furthermore, at S1320 performing the group play function, when the second transparent display provided in another display apparatus and the first transparent display at least partly overlap with each other, the interoperation may be performed with another display apparatus in order to provide an interoperation screen through the overlapping area.

Further, the operation at S1320 may include displaying the graphic guide to encourage gradually adjusting the size of the overlapping area between the first transparent display and the second transparent display, on at least one of the first transparent display and the second transparent display.

Furthermore, the operation at S1320 for performing the group play function may include displaying 3D content screen combining left-eye image and right-eye image of 3D content on one of the first and the second transparent display, and the displaying barrier screen corresponding to 3D content screen on the other of the first and the second transparent display, when 3D content is played back while the first and the second transparent display overlap with each other.

The operation at S1320 for performing the group play function may include displaying the front image on the transparent display arranged in a direction close to the user, from among the first and the second transparent display, and displaying the background image on the other transparent display, from among the first and the second transparent display, when the content including front image and background image is played back while the first and the second transparent display overlap with each other.

Furthermore, the operation at S1320 for performing the group play function may include obtaining the first image by photographing the object in response to an input command, transmitting a command to photograph to another display apparatus, receiving the second image photographed in another display apparatus, and creating content by combining the first and the second image.

The creating content may create a combined image by performing at least one of the size change and the color compensation regarding the image so as to correspond to at least one of the first and the second image, and combining them together.

Furthermore, the creating content may create 3D content using one of the first and the second image as left-eye image and the other of the first and the second image as right-eye image.

The creating content may further include the sensing whether the first transparent display and another display apparatus overlap with each other or not, and the displaying a message inquiring as to whether or not to perform the group play function between another display apparatus, on the first transparent display, when the overlapping of the first transparent display and another display apparatus is sensed. The group play function may be performed in response to input of a user approval corresponding to the message.

Figure 14:
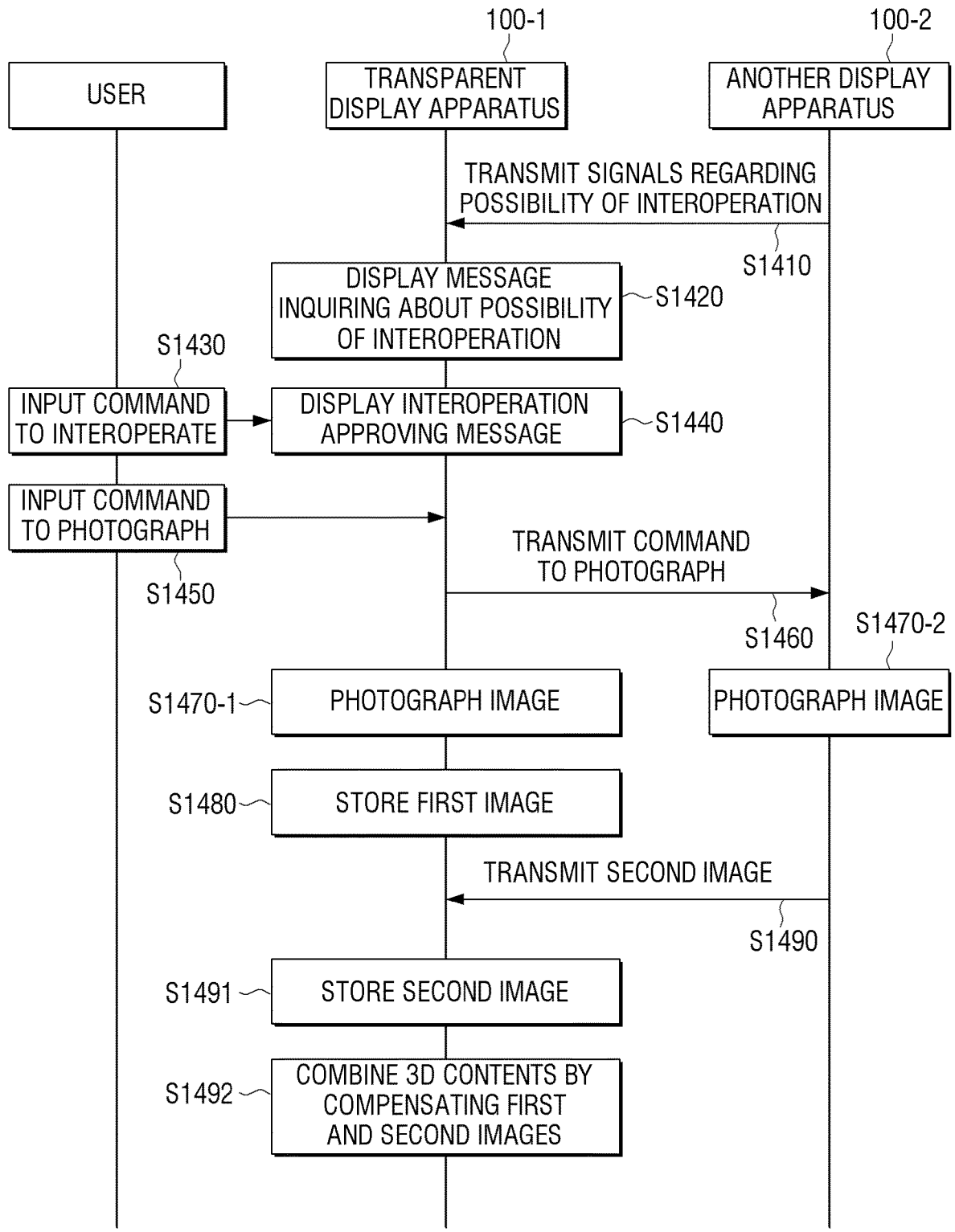
FIG. 14 depicts a sequence view provided to explain a group play performing method of a transparent display apparatus and another display apparatus, according to an exemplary embodiment.

FIG. 14 depicts a sequence view provided to explain the group play performing method in the transparent display apparatus 100-1 and another display apparatus 100-2, according to an exemplary embodiment.

Specifically, FIG. 14 depicts a sequence diagram describing the interoperation and the photographing simultaneously, according to an exemplary embodiment. When the transparent display apparatus 100-1 and another display apparatus 100-2 are overlapped by a user, another display apparatus 100-2 may transmit the signals regarding possibility of interoperation to the transparent display apparatus 100-1 at S1410. The transparent display apparatus 100-1 may display a message inquiring about the possibility of interoperation by receiving the signals regarding possibility of interoperation at S1420. Thus, when a user inputs a command to interoperate at S1430, the transparent display apparatus 100-1 may display an interoperation approving message at S1440.

When another display apparatus 100-2 includes the second transparent display 110-2, the group play function may be performed by providing the interoperation screen through the overlapping area if the transparent display apparatus 100-1 and another display apparatus 100-2 at least partly overlap with each other.

When a user inputs a command to photograph at S1450, the transparent display apparatus 100-1 may transmit the command to photograph to another display apparatus 100-2 at S1460, and the transparent display apparatus 100-1 and another display apparatus 100-2 may perform photographing simultaneously at S1470-1 and S1470-2.

Furthermore, the transparent display apparatus 100-1 may store the photographed first image at S1480, receive and store the photographed second image by another display apparatus 100-2 at S1490 and S1491. The transparent display apparatus 100-1 may combine 3D content by compensating the stored first and second image so as to correspond to each other at S1492. The compensating may comprise at least one of the size change and the color compensation so as to correspond to at least one of the first and the second image. The operation at S1492 for combining 3D content may create 3D content using one of the first and the second image as left-eye image and the other of the first and the second image as right-eye image.

Figure 15:
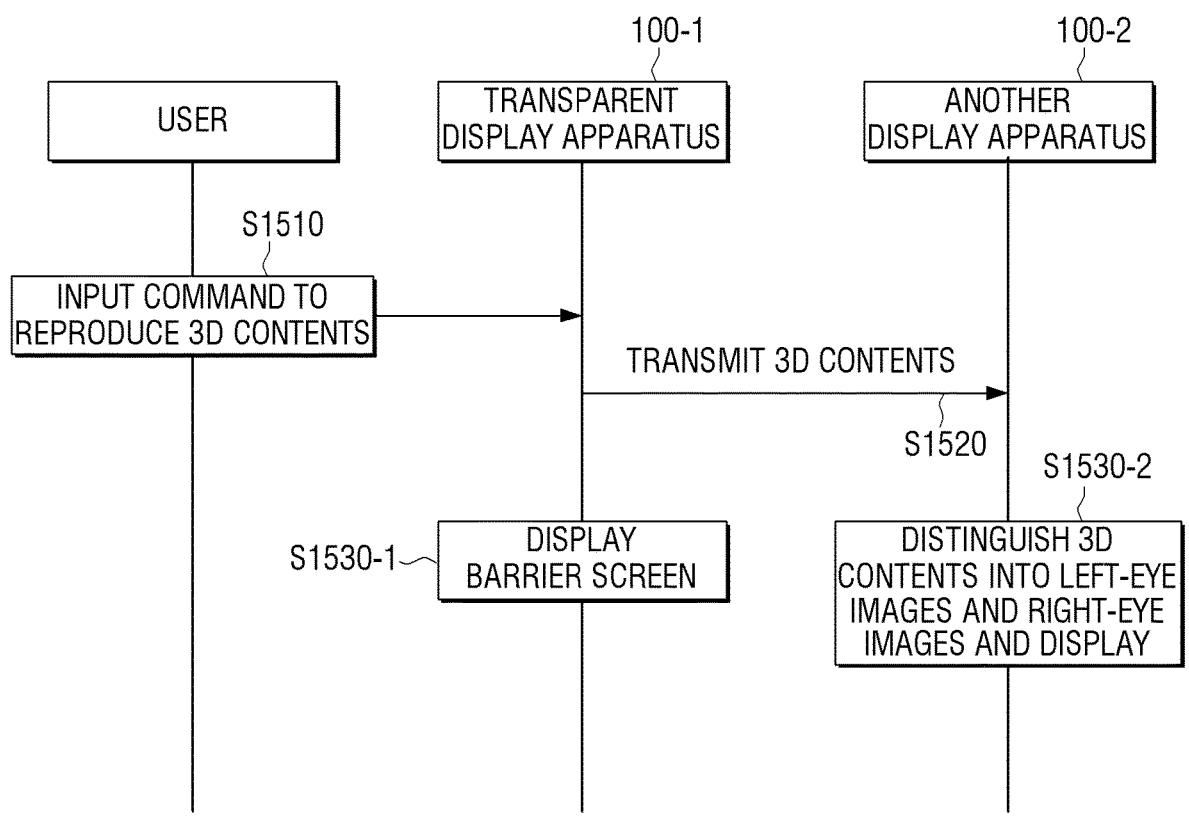
FIG. 15 depicts a sequence view provided to explain a group play performing method of a transparent display apparatus and another display apparatus including a second transparent display, according to another exemplary embodiment.

FIG. 15 depicts a sequence view provided to explain the group play performing method in the transparent display apparatus 100-1 and another display apparatus 100-2 including the second transparent display 110-2, according to another exemplary embodiment.

Specifically, referring to FIG. 15, a user may input a command to play back 3D content at S1510 regarding the transparent display apparatus 100-1 and another display apparatus 100-2 which are interoperating with each other. A user command may be input through the button provided on the transparent display apparatus 100-1, or through the touch input using the first transparent display 110-1.

The transparent display apparatus 100-1 may transmit 3D content to another display apparatus according to the user's input of a command to play back 3D content at S1520. Furthermore, the first transparent display may display barrier screen corresponding to 3D content at S1530-1, and the second transparent display may display the received 3D content by distinguishing left-eye image and right-eye image at S1530-2. However, this is merely an exemplary embodiments and the first transparent display 110-1 may display 3D content, and the second transparent display 110-2 may display the barrier screen.

Figure 16:
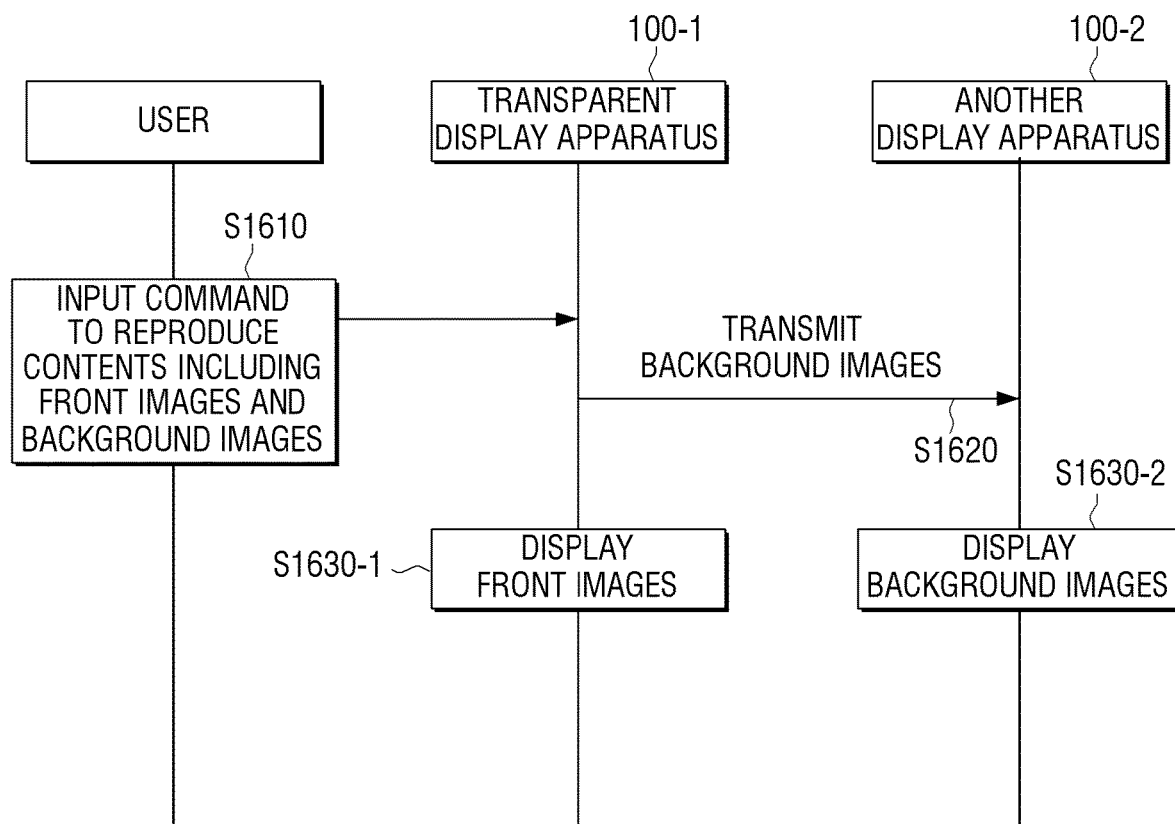
FIG. 16 depicts a sequence view provided to explain a group play performing method of a transparent display apparatus and another display apparatus including a second transparent display, according to another exemplary embodiment.

FIG. 16 depicts a sequence view provided to explain the group play performing method in the transparent display apparatus 100-1 and another displaying apparatus 100-2 including the second transparent display 110-2, according to another exemplary embodiment.

Specifically, referring to FIG. 16, a user may input a command to play back the content including front image and background image at S1610 regarding the transparent display apparatus 100-1 and another display apparatus 100-2 which are interoperating with each other. A user command may be input through the button provided on the transparent display apparatus 100-1, or through the touch input using the first transparent display 110-1.

The transparent display apparatus 100-1 may transmit only the background image to another display apparatus 100-2 according to the user's input of a command to play back 3D content at 51620. The first transparent display 110-1 may display the front image at 51630-1, and the second transparent display 110-2 may display the received background image at S1630-2. However, this is merely an exemplary embodiments and the first transparent display 110-1 may display the background image and the second transparent display 110-2 may display the front image.

Figure 17:
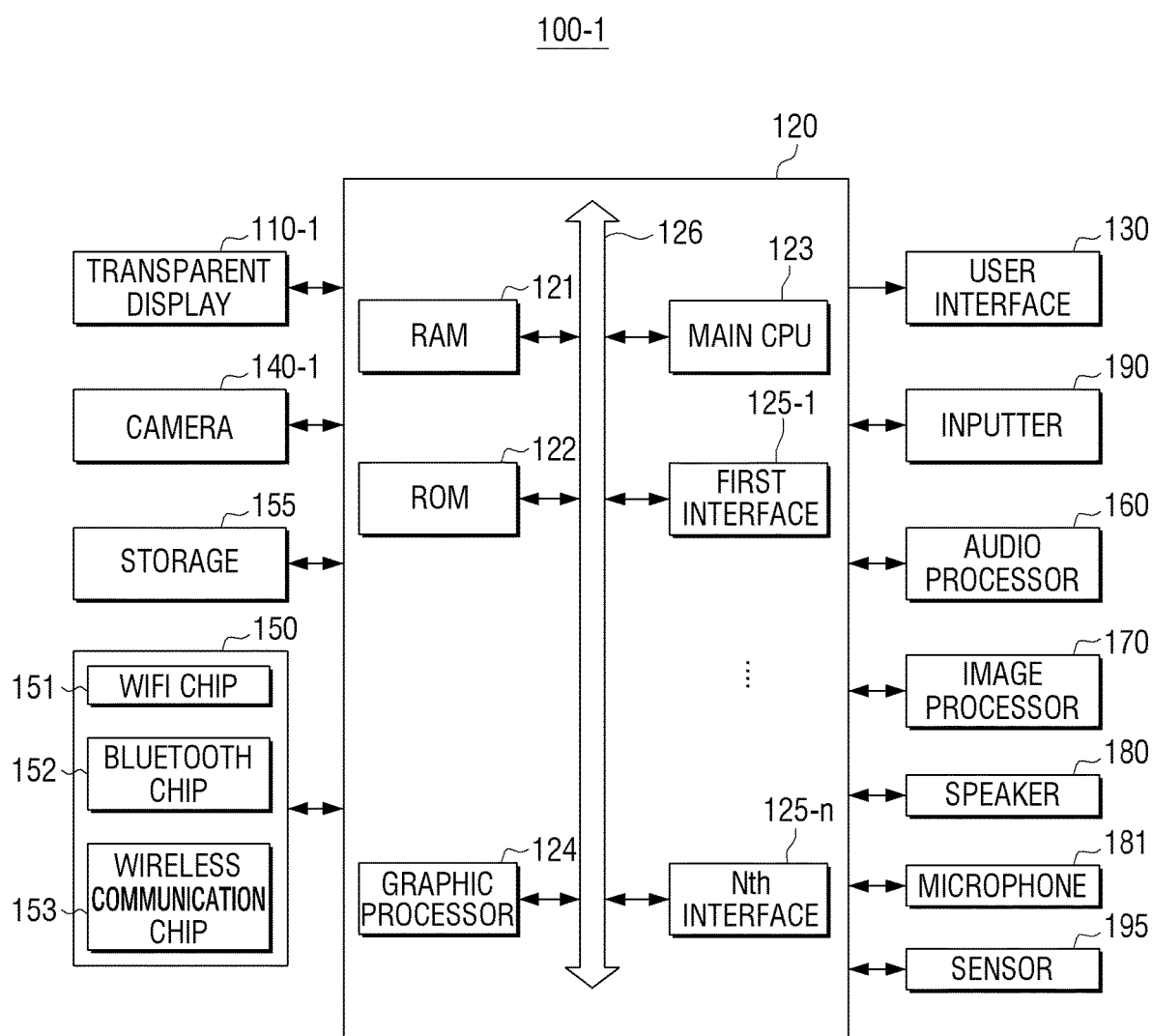
FIG. 17 is a block diagram of a transparent display apparatus, according to another exemplary embodiment.

FIG. 17 is a block diagram of the transparent display apparatus 100-1, according to another exemplary embodiment. Referring to FIG. 17, the transparent display apparatus 100-1 may include the first transparent display 110-1, the controller 120, the interface 130, the camera 140-1, the communicator 150, the storage 155, an inputter 190, an audio processor 160, the image processor 170, a speaker 180, a microphone 181, the inputter 190 and a sensor 195. The units of FIG. 17 overlapping with those of FIG. 2 will not be explained in detail below as they have been described above.

The controller 120 may control general operation of the transparent display apparatus 100-1 by using a plurality of the stored programs in the storage 155.

Specifically, the controller 120 may include RAM 121, ROM 122, a main CPU 123, a graphic processor 124, a first to an nth interface 125-1~125-n, and the bus 126.

RAM 121, ROM 122, the main CPU 123, the graphic processor 124, and the first to the nth interface 125-1~125-n may be connected to each other through the bus 126.

The first to the nth interface 125-1 to 125-n may connect to a plurality of the above described units. One of the interfaces may be network interface connecting to an external device through network.

The main CPU 123 may access to the storage 155, and perform booting by using the stored O/S in the storage 155. Furthermore, various operation may be performed by using a plurality of the programs, 3D content, and the content including front image and background image stored on the storage 155.

ROM 122 may store command sets for the system booting. In response to inputting of a turn-on command and supply of the electrical power, the main CPU 123 may copy the stored O/S on the storage 155 to RAM 121 according to the stored commands on ROM 122, and boot the system by implementing O/S. When the booting completes, the main CPU 123 may copy a plurality of the stored application programs on the storage 155 to RAM 121, and perform various operation by implementing the copied application programs in RAM 121.

The graphic processor 124 may create a screen including various objects such as icon, image, and text by using a calculator and a renderer. The calculator may calculate attribute values such as coordinate value, form, size, and color in which each object will be displayed according to the layout of the screen based on the received controlling commands. The renderer may create various layouts of the screens including the objects based on the calculated attribute values in the calculator. The screens created in the renderer may be displayed within the display area of the first transparent display 110-1.

Meanwhile, the above described operation of the controller 120 may be performed by the programs stored in the storage 155. Furthermore, the controller 120 may control the storing of the first image photographed by the camera 140-1 in the storage 155.

In response to input of a user command to photograph through the inputter 190, the controller 120 may photograph an object by controlling the camera 140-1, transmit a command to photograph to another display apparatus 100-2, and control the image processor 170 to create content by combining the first and the second image when the second image photographed by another display apparatus 100-2 is received through the interface 130.

The controller 120 may control the image processor 170 to create a combined image by performing at least one of the size change and the color compensation regarding the image so as to correspond to at least one of the first and the second image.

The controller 120 may control the image processor 170 to create 3D content using one of the first and the second image as left-eye image and the other one of the first and the second image as right-eye image.

The controller 120 may display the graphic guide to encourage gradually adjusting the size of the overlapping area between the first transparent display 110-1 and the second transparent display 110-2 on at least one of the first and the second transparent display 110-1, 110-2.

The storage 155 may store various data such as Operating System (O/S) software module to drive the transparent display apparatus 100-1, the images photographed by the camera 140-1, 3D content, and the content including front image and background image.

In this case, the controller 120 may display 3D content and the content including front image and background image on the transparent display apparatus 100-1 and another display apparatus 100-2 based on the information stored in the storage 155.

The inputter 190 may receive a user command. The inputter 190 may be implemented in various forms such as remote controlling receiver, button, and touch pad.

The first transparent display 110-1 may display various screens. The screens may include screens displaying playback of various content such as image, video, text and music, application implementing screens including various content, web browser screens, and graphic user interface (GUI) screens.

In this case, the first transparent display 110-1 may be implemented to be OLED; however, it may not be limited thereto. Further, the first transparent display 110-1 may be implemented to be flexible display.

Specifically, the first transparent display 110-1 may display the stored 3D content and the content including front image and background image based on the controlling of the controller 120.

The sensor may include a touch sensor, a geomagnetic sensor, a gyro sensor, an acceleration sensor, a near field sensor, and a grip sensor. The sensor may sense various manipulation such as rotating, tilting, pressing, approaching, and gripping in addition to the touching described above.

The touch sensor may be implemented as a capacitive or resistive touch sensor. The capacitive touch sensor refers to a sensor according to a method of calculating touch coordinate values by using the coated dielectric material on the display surface and by sensing the micro-electricity excited with the user body when a body of a user partly touches the display surface. The resistive touch sensor refers to a touch sensor according to a method of calculating touch coordinate values by including two electrode substrates within the transparent display apparatus 100-1 and by sensing the electrical flow with the contacts of the upper and the lower substrate on the touched point when a user touches the sensor. Besides, the infrared sensing method, the surface ultrasound conductive method, the integral tension measuring method, and the piezo effect method may be used to sense touch interactions.

The transparent display apparatus 100-1 may determine whether a touch object such as finger or stylus pen contacts or approaches by using a magnet and a magnetic field sensor, an optical sensor or the near field sensor instead of the touch sensor.

The geomagnetic sensor is provided to sense rotating situation and moving direction of the transparent display apparatus 100-1. The gyro sensor is provided to sense rotating angle of the transparent display apparatus 100-1. The geomagnetic sensor and the gyro sensor may be both included. However, even when only one is included, the transparent display apparatus 100-1 may sense rotating situation.

The acceleration sensor is provided to sense tilting degree of the transparent display apparatus 100-1.

The near field sensor is provided to sense approaching motion without directly contacting the display surface. The near field sensor may form the high frequency wave field, and may be implemented to be various types of sensors such as high frequency emitting type to sense the electrical currents induced by the features of the magnetic field which changes when an object approaches, magnetic type to use the magnet, and capacitance type to sense the capacitance which changes when an object approaches.

The grip sensor is arranged on the back face, the boundary and the handled part of the transparent display apparatus 100-1 separately from the touch sensor provided on the touch screen, and to sense the gripping by a user. The grip sensor may be also implemented to be pressure sensor as well as touch sensor.

The audio processor 160 is configured to perform processing regarding audio data. The audio processor 160 may perform processing such as decoding, amplifying, and noise filtering regarding audio data.

The speaker 180 is configured to output various alarm sounds or voice messages as well as various audio data processed in the audio processor 160.

The button may be implemented in various different forms such as mechanical button, touch pad and wheel formed on voluntary area such as front section, sided section, and back section of the exterior main body regarding the transparent display apparatus 100-1.

The camera 140-1 is configured to photographs still images or moving video based on user input. A plurality of cameras may be implemented, such as front camera and back camera.

The microphone 181 is configured to receive the input of user voices or other sounds and is configured to convert the input sounds into audio data.

The sensor 195 may sense whether the first transparent display 110-1 and the second transparent display 110-2 overlap each other. When the first transparent display 110-1 and the second transparent display 110-2 overlap with each other, the controller 120 may display a message inquiring about possibility of interoperation with another display apparatus 100-2 on the first transparent display 110-1, and perform interoperation with another display apparatus 100-2 through the interface 130 in response to an input of a command to interoperate.

A user may perform functions that cannot be obtained from the related display apparatuses by using the transparent display apparatus 100-1 and another display apparatus 100-2, which enhances the user satisfaction. The following description will explain that the group play performing method, which uses the transparent display apparatus 100-1 and another display apparatus 100-2, that may be implemented by using only the transparent display apparatus 100-1.

Figure 18:
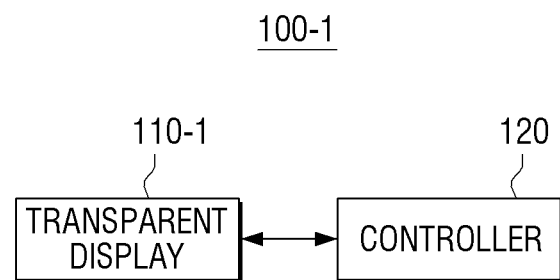
FIG. 18 is a block diagram of a transparent display apparatus, according to another exemplary embodiment.

FIG. 18 is a block diagram of the transparent display apparatus 100-1, according to another exemplary embodiment. Referring to FIG. 18, the transparent display apparatus 100-1 may include the first transparent display 110-1 and the controller 120.

The first transparent display 110-1 may have the flexible properties. The transparent display apparatus 100-1 including the first transparent display 110-1 having the flexible property refers to a apparatus that can be bent, curved, folded, or rolled like a paper while keeping the display features of the related flat display apparatus. Thus, the transparent display apparatus 100-1 including the flexible first transparent display 110-1 should be produced on a flexible substrate. Specifically, the transparent substrate 111-1 may be implemented to be a polymer materials, such as plastics that can be modified with the external pressure while having the transparent properties.

The first transparent display 110-1 may have the properties in which the bending can be performed. Therefore, the first transparent display 110-1 should be produced with the structure and the materials in which the bending can be performed. Because the first transparent display 110-1 is produced with the structure and the materials that can be bent, when the external power is given to the flexible first transparent display 110-1, modification such as bending, rolling, or the combination thereof may occur according to the type of the external power.

The bending may include normal bending, folding, and rolling. The normal bending refers to a situation in which the display apparatus is bent.

The folding refers to a situation in which the display apparatus is folded. The folding and the normal bending may be distinguished according to the degree of the bending. For example, the bending may be defined to be folding when the bending is performed at more than a certain angle, and defined to be normal bending when the bending is performed at less than a certain angle.

The rolling refers to a situation in which the display apparatus is rolled over. The rolling may also be determined based on a bending angle. For example, the rolling may be defined as a situation in which bending at more than a certain angle is sensed over a certain area. Meanwhile, the folding may be defined as a situation in which bending at less than a certain angle is sensed over a relatively small area compared to the rolling. The above described normal bending, folding, and rolling may be defined based on the curvature radius as well as bending angle.

Furthermore, regardless of the curvature radius, the rolling may be defined as a situation in which the crossed section of the rolled display apparatus has a shape substantially close to a circle or an oval.

However, the above definitions regarding various modification described above are merely provided as examples, as these may be defined differently according to types, sizes, weights, or characteristics of the display apparatus. For example, when the surface of the display apparatus can be bent so as to come in contact with itself, the folding may be defined to be a state in which the apparatus surface comes in contact to itself, simultaneously while being bent. Meanwhile, the rolling may be defined to be a state in which the front face and the back face in the display apparatus come in contact with each other because of the bending.

For convenient explanation, various forms of the bending and other bending shapes will be simply referred to hereinafter as "bending".

When the overlapping area is created by bending first area of the first transparent display 110-1 to overlap with second area of the first transparent display 110-1, the controller 120 may respectively control the display operation on the first and the second area, and control the first transparent display 110-1 to display an interoperation screen on the overlapping area.

Further, the controller 120 may display different screens on each area by separately controlling the overlapping area and third area, i.e., the other area which is not overlapped with the first area on the first transparent display 110-1.

Further, the controller 120 may display 2D image on the third area and 3D image on the overlapping area.

The controller 120 may display the graphic guide to encourage gradually adjusting the size of the overlapping area in the first transparent display 110-1 on the first display apparatus 100-1.

When 3D content is played back while the first area and the second area are overlapped with each other, the controller 120 may display 3D content screen combining left-eye image and right-eye image of 3D content on one of the first and the second area, and display barrier screen corresponding to 3D content screen on the other of the first and the second area.

Furthermore, when the content including front image and background image is played back while the first area and the second area are overlapped with each other, the controller 120 may display the front image on the area arranged in a direction closer to the user, from among the first and the second area, and display the background image on the other area from among the first and the second area, according to an exemplary embodiment.

The sensor for sensing whether the first area and the second area are overlapped with each other may further be included. When the first area and the second area are sensed to be overlapped with each other, the controller 120 may display a message inquiring about possibility of interoperation the first area and the second area on the first transparent display 110-1, according to an exemplary embodiment, and perform interoperation the first and the second area in response to inputting of a command to interoperate.

When the overlapping area including three or more transparent layers is created by bending the first transparent display 110-1 a plurality of times, the controller 120 may distinguish a three-dimensional image into two-dimensional slice images in which a number of the slice images corresponds to a number of the layers in the overlapping area, and display respectively on the transparent layers.

The following will explain basic constitution and various embodiments for clear understanding of the embodiments. However, the following will not provide the overlapping explanation regarding the group play function using the transparent display apparatus 100-1 and another display apparatus 100-2.

Figure 19:
FIG. 19 depicts a view provided to explain functions provided according to bending of a first transparent display, according to another exemplary embodiment.
Figure 19:
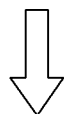
Figure 19:
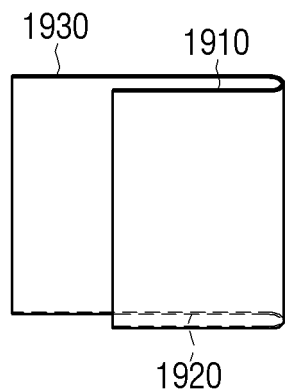

FIG. 19 depicts a view provided to explain functions provided by bending the first transparent display 110-1, according to another exemplary embodiment.

Referring to FIG. 19, the controller 120 may respectively control the display operation on the first area 1910 and the second area 1920 and control the first transparent display 110-1 to display the interoperation screen on the overlapping area when the first area 1910 of the first transparent display 110-1 is bent and overlapped with the second area 1920 of the first transparent display 110-1.

Specifically, when 3D content is played back while the first area 1910 and the second area 1920 are overlapped with each other, the controller 120 may display 3D content screen combining left-eye image and right-eye image of 3D content on one of the first area 1910 and the second area 1920, and display barrier screen corresponding to 3D content screen on the other of the first area 1910 and the second area 1920. However, it may not be limited to the above and the controller 120 may also display the content, which is previously displayed before the bending, while the first transparent display 110-1 is bent.

Furthermore, when the content including front image and background image is played back while the first area 1910 and the second area 1920 are overlapping each other, the controller 120 may display the front image on the area arranged in a direction closer to the user, from among the first area 1910 and the second area 1920, and display the background image on the other area among the first area 1910 and the second area 1920. However, it may not be limited thereto and the controller 120 may display the front image on the area arranged in a direction farther from the user, from among the first area 1910 and the second area 1920, and display the background image on the other area among the first area 1910 and the second area 1920, and display the previously displayed content, displayed before the bending, while the first transparent display 110-1 is bent.

When the first area 1910 and the second area 1920 are sensed to be overlapped with each other, the controller 120 may display a message inquiring about possibility of interoperation the first area 1910 and the second area 1920 on the first transparent display 110-1, and perform the interoperation of the first area 1910 and the second area 1920 in response to input of a command to interoperate. The relevant explanation for the interoperation is described above with referring to FIG. 5, which will not be explained below.

Meanwhile, the controller 120 may display different screens on each area by separately controlling the third area 1930 which is the area not being overlapped by the first area 1910. Specifically, the controller 120 may display 2D images on the third area 1930, and display 3D images on the overlapping area, according to an exemplary embodiment. However, it may not be limited thereto and the controller 120 may display a menu screen on the third area 1930 to control the overlapping area. The controller 120 may further display uniform content on the third area 1930 and the overlapping area.

Figure 20:
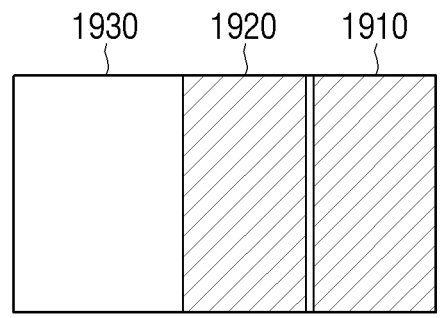
FIG. 20 illustrates a method of providing a bending guide by distinguishing a first area, a second area and a third area of a first transparent display, according to another exemplary embodiment.

FIG. 20 illustrates a method of providing a bending guide by distinguishing the first area 1910, the second area 1920, and the third area 1930 on the first transparent display 110-1, according to another exemplary embodiment.

Referring to FIG. 20, the controller 120 may display the graphic guide to encourage gradually adjusting the size of the overlapping area regarding the first transparent display 110-1 on the first transparent display 110-1. Although FIG. 20 illustrates the graphic guide distinguishing three areas (1910, 1920 and 1930), it may not be limited thereto. For example, the controller 120 may provide the graphic guide distinguished with two or more areas, and provide UI to modify or establish the graphic guide by a user. The constitution for providing the graphic guide is described above by referring to FIGS. 8A, 8B, 8C and 8D, which will not be further explained below.

Figure 21:
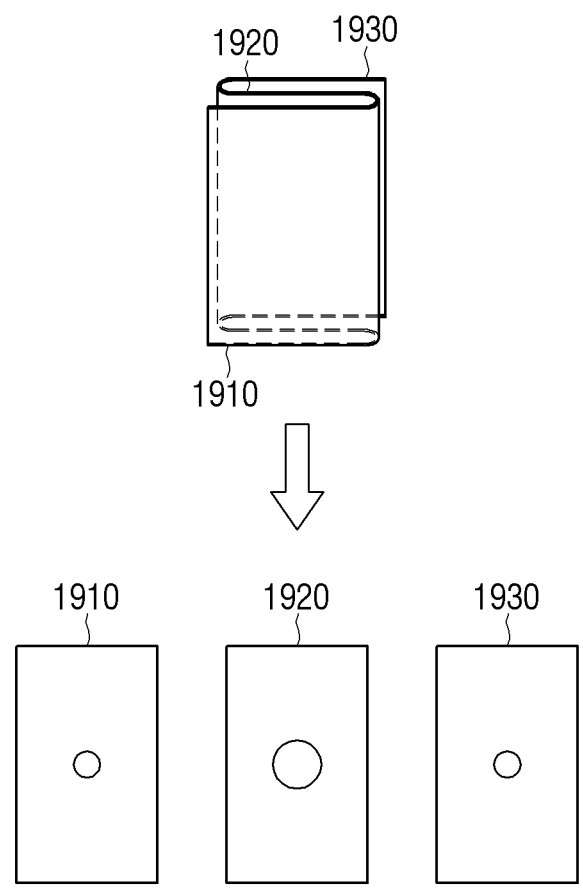
FIG. 21 depicts a view provided to explain an example in which a first transparent display is bent a plurality of times, according to another exemplary embodiment.

FIG. 21 depicts a view provided to explain that the first transparent display 110-1 is bent a plurality of times according to another embodiment.

Referring to FIG. 21, when the first transparent display 110-1 is bent a plurality of times and the overlapping area including at least three transparent layers is created, the controller 120 may distinguish a three-dimensional image into two-dimensional slice images in which a number of slice images corresponds to a number of the layers of the overlapping area, and respectively displays the slice images on the transparent layers of the overlapping area.

FIG. 21 illustrates that the first transparent display 110-1 is bent two times, and the overlapping area including the three transparent layers is created. However, it may not be limited thereto. The first transparent display 110-1 may be bent three or more times according to the size of the display apparatus.

Furthermore, the first area 1910 may be positioned in the front side, the second area 1920 in the middle, and the third area 1930 in the back side in the overlapping area. The controller 120 may slice one three-dimensional image into three two-dimensional slice images in order to display the three-dimensional image. For example, when the three-dimensional image is sphere, the three two-dimensional slice images may be circle. Regarding the size, the middle image may be greatest circle while the other two images may be uniform size circle, according to the exemplary embodiment. The controller 120 may display the middle image on the second area 1920, and display the other two images on the first area 1910 and the third area 1930. The controller 120 may create and apply two-dimensional slice images uniformly regarding the other shapes. Three-dimensional image may be more correctly expressed as a number of the transparent layers increases because a number of the bending increases.

It is described above that the three-dimensional image may be displayed by distinguishing the two-dimensional slice images. However, it may not be limited thereto. For example, the content displayed before the bending may be displayed while the first transparent display 110-1 is bent.

By using the transparent display apparatus 100-1, a user can obtain the functions which are not provided from the related display apparatuses, and the user satisfaction can be enhanced.

Meanwhile, the controlling method of the transparent display apparatus according to the various embodiments may be implemented to be program codes that can be run by a computer, and provided to each device so as to be implemented by a processor while being stored in various non-transitory computer readable recording medium.

For example, a non-transitory computer readable recording medium storing the programs performing the communication with another display apparatus when the first transparent display provided on the transparent display apparatus and another display apparatus at least partly overlap with each other, and performing the group play function to provide one service in interoperation with another display apparatus may be provided.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A transparent display apparatus, comprising:
    a first transparent display, the transparent display apparatus being a first transparent display apparatus;
    a network interface configured to perform communication with a second transparent display apparatus comprising a second transparent display;
    a camera;
    a sensor; and
    a processor configured to:
        based on at least partial overlap between the first transparent display and the second transparent display being detected by the sensor, control the first transparent display to display a message inquiring about possibility of interoperation with the second transparent display apparatus,
        based on a command to interoperate being input, control the network interface to communicate with the second transparent display apparatus, and
    obtain a control authority of the second transparent display apparatus by interoperating with the second transparent display apparatus
    wherein the processor is further configured to:
    based on an input of a command to capture an image, control the camera to obtain a first image of an object, transmit the command to capture the image to the second transparent display apparatus through the network interface, receive a second image of the object through the network interface, and create content by combining the first image and the second image, the second image of the object being obtained by the second transparent display apparatus.

2. The transparent display apparatus of claim 1, wherein the processor is further configured to, based on the sensor detecting the at least partial overlap between the first transparent display and the second transparent display, interoperate with the second transparent display apparatus so as to provide an interoperation screen on an overlapping area of the first transparent display and the second transparent display.

3. The transparent display apparatus of claim 2, wherein the processor is further configured to display a graphic guide to encourage gradually adjusting a size of the overlapping area between the first transparent display and the second transparent display on at least one of the first transparent display and the second transparent display.

4. The transparent display apparatus of claim 2, wherein the processor is further configured to, when 3D content is played back while the first transparent display and the second transparent display overlap each other, display a 3D content screen combining a left-eye image and a right-eye image of the 3D content on one of the first transparent display and the second transparent display, and display a barrier screen corresponding to the 3D content screen on the other of the first transparent display and the second transparent display.

5. The transparent display apparatus of claim 2, wherein the processor is further configured to, when content including a front image and a background image is played back while the first transparent display and the second transparent display overlap each other, display the front image on a transparent display arranged closer to a user, from among the first transparent display and the second transparent display, and display the background image on a remaining transparent display among the first transparent display and the second transparent display.

6. The transparent display apparatus of claim 1, further comprising:
    a storage configured to store the first image; and
    an input interface configured to receive the command to capture the image.

7. The transparent display apparatus of claim 6, wherein the processor is further configured to create a combined image by performing at least one of size change and color compensation on one of the first image and the second image so as to correspond to the other of the first image and the second image.

8. The transparent display apparatus of claim 6, wherein the processor is configured to create the 3D content using one of the first image and the second image as a left-eye image, and using another one of the first image and the second image as a right-eye image.

9. A transparent display apparatus, comprising:
    a transparent display having a flexible property;
    a sensor; and
    a processor configured to, based on the sensor detecting that a first area of the transparent display being bent at more than a threshold angle and overlapped with a second area of the transparent display, control the transparent display to display an interoperation screen on one of the first area and the second area, by respectively controlling display operation of the first area and the second area,
    wherein the processor is further configured to, based on the transparent display being bent a plurality of times, thus creating an overlapping area including three or more transparent layers, distinguish a three-dimensional image into three or more two-dimensional slice images and respectively display the three or more slices on the three or more transparent layers of the overlapping area, wherein number of the slice images corresponds to number of the layers of the overlapping area.

10. The transparent display apparatus of claim 9, wherein the processor is further configured to display different screens on the transparent display, by separately controlling the overlapping area and a third area, which is separate from the overlapping area.

11. The transparent display apparatus of claim 10, wherein the processor is further configured to display a 2D image on the third area and a 3D image on the overlapping area.

12. The transparent display apparatus of claim 9, wherein the processor is further configured to display a graphic guide to encourage gradually adjusting a size of the overlapping area regarding the transparent display on the transparent display.

13. The transparent display apparatus of claim 9, wherein the processor is further configured to, when 3D content is played back while the first area and the second area are overlapping each other, display a 3D content screen combining a left-eye image and a right-eye image of the 3D content on one of the first area and the second area, and display a barrier screen corresponding to the 3D content screen on the other of the first area and the second area.

14. The transparent display apparatus of claim 9, wherein the processor is further configured to, based on content including a front image and a background image being played back while the first area and the second area are overlapping each other, display the front image on an area arranged closer to a user from among the first area and the second area, and display the background image on a remaining area of the first area and the second area.

15. The transparent display apparatus of claim 9, wherein the processor is further configured to, based on the first area and the second area being sensed to be overlapping each other, display a message inquiring about a possibility of an interoperation of the first area and the second area on the transparent display, and perform the interoperation the first area and the second area based on an input of a command to interoperate.

* * * * *